United States Patent
Chiou

(10) Patent No.: US 9,976,088 B2
(45) Date of Patent: May 22, 2018

(54) LIQUID CRYSTAL ALIGNMENT AGENT, LIQUID CRYSTAL ALIGNMENT FILM, AND LIQUID CRYSTAL DISPLAY ELEMENT HAVING THE SAME

(71) Applicant: CHI MEI CORPORATION, Tainan (TW)

(72) Inventor: Shin-Rong Chiou, Kaohsiung (TW)

(73) Assignee: CHI MEI CORPORATION, Tainan (TW)

( * ) Notice: Subject to any disclaimer, the term of this patent is extended or adjusted under 35 U.S.C. 154(b) by 66 days.

(21) Appl. No.: 15/207,498

(22) Filed: Jul. 11, 2016

(65) Prior Publication Data
US 2017/0029703 A1  Feb. 2, 2017

(30) Foreign Application Priority Data

Jul. 27, 2015  (TW) .............................. 104124278 A

(51) Int. Cl.
| | |
|---|---|
| C08G 73/10 | (2006.01) |
| C08L 67/00 | (2006.01) |
| C08L 73/00 | (2006.01) |
| C08L 77/00 | (2006.01) |
| C08L 79/00 | (2006.01) |
| C09K 19/56 | (2006.01) |
| C09D 179/08 | (2006.01) |
| G02F 1/1337 | (2006.01) |

(52) U.S. Cl.
CPC .......... *C09K 19/56* (2013.01); *C08G 73/1042* (2013.01); *C08G 73/1067* (2013.01); *C08G 73/1078* (2013.01); *C09D 179/08* (2013.01); *G02F 1/133788* (2013.01)

(58) Field of Classification Search
None
See application file for complete search history.

(56) References Cited

U.S. PATENT DOCUMENTS

2010/0047482 A1 * 2/2010 Kim .................... C08G 73/1042
 428/1.2
2017/0199434 A1 * 7/2017 Hosaka ............. G02F 1/133723

FOREIGN PATENT DOCUMENTS

| JP | 2004-83810 A | 3/2004 |
|---|---|---|
| JP | 2005-037654 A | 2/2005 |
| TW | 200736214 A | 10/2007 |
| WO | WO 2012/157983 | * 11/2012 |
| WO | WO 2014/157235 | * 10/2014 |
| WO | WO 2014/208609 | * 12/2014 |
| WO | WO2014208609 A1 | 2/2017 |

* cited by examiner

*Primary Examiner* — Robert T Butcher
(74) *Attorney, Agent, or Firm* — CKC & Partners Co., Ltd.

(57) ABSTRACT

A liquid crystal alignment agent of the present invention includes a polymer composition (A) synthesized by tetracarboxylic dianhydride compound (a) and diamine compound (b), and a solvent (B). The diamine compound (b) includes diamine (b-1) shown as following formula (I) and diamine (b-2):

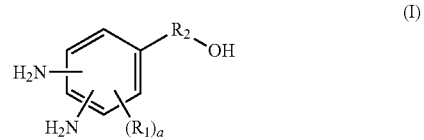

(I)

in formula (I), $R_1$ represents a linear or branched alkyl of 1 to 6 carbons, a linear or branched hydroxyl alkyl of 1 to 6 carbons, an alkoxy of 1 to 6 carbons, an alkylthio of 1 to 6 carbons, a halogen atom, an amino group or a nitro group; $R_2$ represents a methylene group, a divalent alkyl of 2 to 10 carbons, a divalent alkenyl of 2 to 7 carbons or a divalent alkynyl of 2 to 6 carbons; and a represents an integer of 0 to 3.

8 Claims, 1 Drawing Sheet

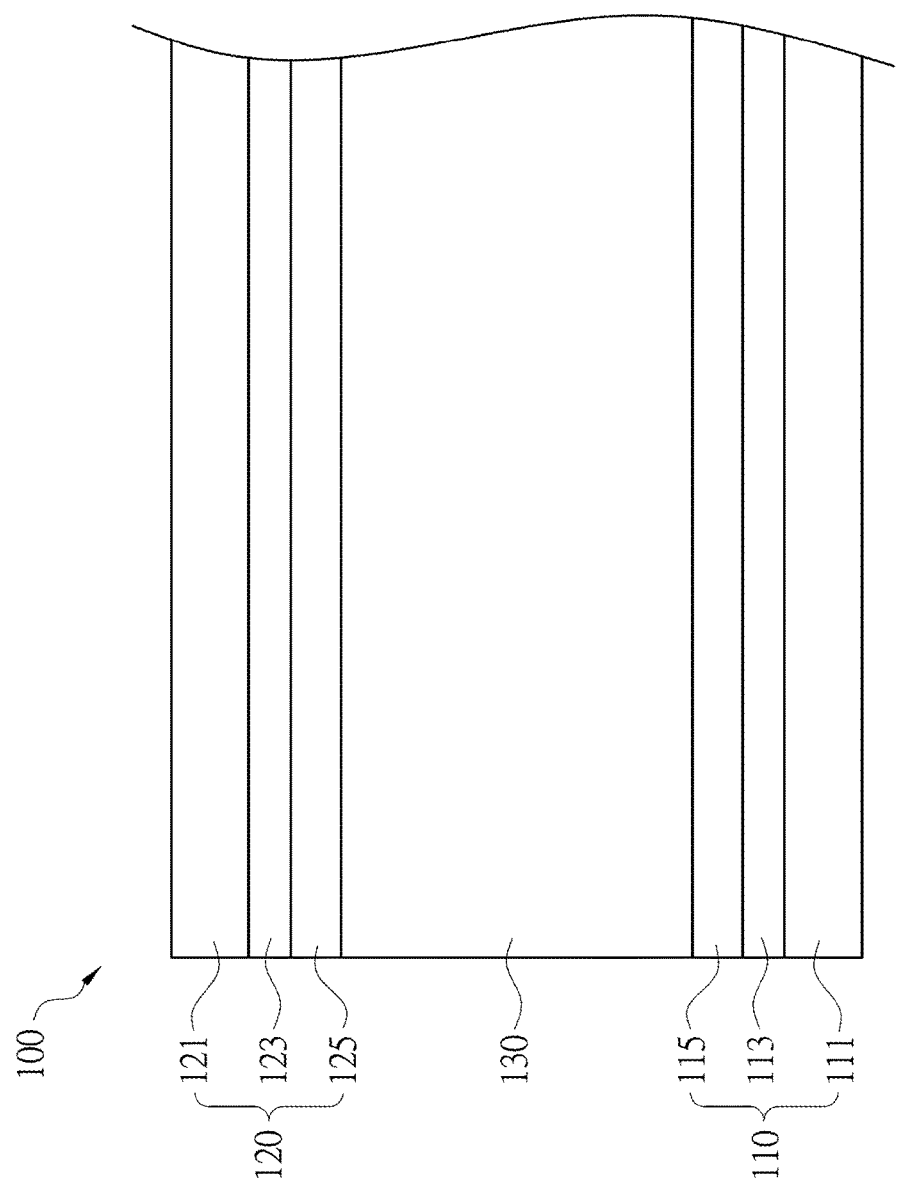

LIQUID CRYSTAL ALIGNMENT AGENT, LIQUID CRYSTAL ALIGNMENT FILM, AND LIQUID CRYSTAL DISPLAY ELEMENT HAVING THE SAME

RELATED APPLICATIONS

This application claims priority to Taiwan Application Serial Number 104124278, filed on Jul. 27, 2015, which is herein incorporated by reference.

BACKGROUND

Field of Invention

The present invention relates to a liquid crystal alignment agent, a liquid crystal alignment film and a liquid crystal display element. More particularly, the present invention provides a liquid crystal alignment agent with better reliability and response velocity of a liquid crystal, a liquid crystal alignment film formed by the liquid crystal alignment agent, and a liquid crystal display element having the liquid crystal alignment film.

Description of Related Art

Based on a working mechanism of a liquid crystal display element, the conventional liquid crystal display element can include a liquid crystal molecule with positive dielectric anisotropy, and the conventional liquid crystal display element can include twisted nematic type (TN type), super twisted nematic type (STN type), vertical alignment type (VA type), in plane switching type (IPS type), fringe field switching type (FFS type), optically compensated bend type (OCB type) or the like. A liquid crystal alignment film formed by an organic film is utilized to control the alignment of each liquid crystal molecules.

The liquid crystal molecules of the TN type and STN type liquid crystal display element need to have a high-speed response, and the liquid crystal molecules have a certain tilted direction when the liquid crystal of the VA type liquid crystal display element is driven. Therefore, TN type, STN type and VA type all have a property of pretilt angle. In the TN type and STN type liquid crystal display element, the pretilt angle generally is formed by a rubbing method; in the VA type liquid crystal display element, the pretilt angle generally is formed by a rubbing method or is formed by disposing a protrusion on a surface of a substrate.

However, dust or static electricity produced by the aforementioned rubbing method will induce the liquid crystal display element to generate defects of poor display or damaged electric circuit. Moreover, the protrusion disposing on the surface of the substrate decreases brightness of the liquid crystal display element.

JP Patent publication No. 2004-83810 discloses a photo alignment method in which ultraviolet is irradiated on a photosensitive thin film from a direction inclined relative to the normal of the film. A photosensitive organic thin film formed on the substrate is irradiated by a radiation such as a polarized light or a non-polarized light to give the thin film anisotropic property, thereby controlling the alignment of the liquid crystal molecules. The photo alignment method can restrain the dust or static electricity produced by the aforementioned rubbing method to dissolve the defects of poor display or lowing yield.

Besides, JP Patent publication No. 2005-037654 discloses a liquid crystal alignment agent including a repeating unit having conjugated enone and a structure of imide group, and a liquid crystal alignment film is produced by the aforementioned photo alignment method.

However, the aforementioned liquid crystal alignment agent still has defects of poor reliability and response velocity of a liquid crystal.

According to the aforementioned description, for meeting the requirements of the liquid crystal display element, there is a need to provide a liquid crystal alignment agent having excellent reliability and response velocity of a liquid crystal.

SUMMARY

Therefore, an aspect of the present invention provides a liquid crystal alignment agent, and the liquid crystal alignment agent includes a polymer composition (A) and a solvent (B). The liquid crystal alignment agent can enhance reliability and response velocity of a liquid crystal.

Another aspect of the present invention provides a liquid crystal alignment film. The liquid crystal alignment film is formed by the aforementioned liquid crystal alignment agent.

A further aspect of the present invention provides a liquid crystal display element. The liquid crystal display element includes the aforementioned liquid crystal alignment film.

According to the aforementioned aspects, the liquid crystal alignment agent is provided. The liquid crystal alignment agent includes a polymer composition (A) and a solvent (B) all of which are described in details as follows.

Liquid Crystal Alignment Agent
Polymer Composition (A)

The polymer composition (A) includes a polyamic acid polymer, a polyimide polymer, a polyimide-based block copolymer, or a combination thereof. In particular, the polyimide-based block copolymer includes a polyamic acid block copolymer, a polyimide block copolymer, a polyamic acid-polyimide block copolymer, or a combination thereof.

The polyamic acid polymer, the polyimide polymer, and the polyimide-based block copolymer in the polymer composition (A) can all be obtained by reacting a tetracarboxylic dianhydride compound (a) with a diamine compound (b), wherein the tetracarboxylic dianhydride compound (a), the diamine compound (b), and the method of preparing the polymer composition (A) are as described below.

Tetracarboxylic Dianhydride Compound (a)

The tetracarboxylic dianhydride compound (a) includes an aliphatic tetracarboxylic dianhydride compound, an alicyclic tetracarboxylic dianhydride compound, an aromatic tetracarboxylic dianhydride compound, or the tetracarboxylic dianhydride compound shown as following formula (IV-1) to formula (IV-6).

Specific examples of the aliphatic tetracarboxylic dianhydride compound can include but be not limited to ethane tetracarboxylic dianhydride, butane tetracarboxylic dianhydride or the like.

Specific examples of the alicyclic tetracarboxylic dianhydride compound can include but be not limited to 1,2,3,4-cyclobutane tetracarboxylic dianhydride, 1,2-dimethyl-1,2,3,4-cyclobutane tetracarboxylic dianhydride, 1,3-dimethyl-1,2,3,4-cyclobutane tetracarboxylic dianhydride, 1,3-dichloro-1,2,3,4-cyclobutane tetracarboxylic dianhydride, 1,2,3,4-tetramethyl-1,2,3,4-cyclobutane tetracarboxylic dianhydride, 1,2,3,4-cyclopentane tetracarboxylic dianhydride, 1,2,4,5-cyclohexane tetracarboxylic dianhydride, 3,3',4,4'-dicyclohexyl tetracarboxylic dianhydride, cis-3,7-dibutyl-cycloheptyl-1,5-diene-1,2,5,6-tetracarboxylic dianhydride, 2,3,5-tricarboxycyclopentylacetic dianhydride, bicyclo[2.2.2]-oct-7-ene-2,3,5,6-tetracarboxylic dianhydride or the like.

Specific examples of the aromatic tetracarboxylic dianhydride compound can include but be not limited to 3,4-dicarboxy-1,2,3,4-tetrahydro-1-naphthalene succinic acid dianhydride, pyromellitic dianhydride, 2,2',3,3'-benzophenone tetracarboxylic dianhydride, 3,3',4,4'-benzophenone tetracarboxylic dianhydride, 3,3',4,4'-biphenylsulfone tetracarboxylic dianhydride; 1,4,5,8-naphthalene tetracarboxylic dianhydride, 2,3,6,7-naphthalene tetracarboxylic dianhydride, 3,3'-4,4'-diphenyl ethane tetracarboxylic dianhydride, 3,3',4,4'-dimethyl diphenyl silane tetracarboxylic dianhydride, 3,3',4,4'-tetraphenyl silane tetracarboxylic dianhydride, 1,2,3,4-furan tetracarboxylic dianhydride, 2,3,3',4'-diphenyl ether tetracarboxylic dianhydride, 3,3',4,4'-diphenyl ether tetracarboxylic dianhydride, 4,4'-bis(3,4-dicarboxyphenoxy)diphenylsulfide dianhydride, 2,3,3',4'-diphenyl sulfide tetracarboxylic dianhydride, 3,3',4,4'-diphenyl sulfide tetracarboxylic dianhydride, 4,4'-bis(3,4-dicarboxyphenoxy)diphenyl sulfone dianhydride, 4,4'-bis(3,4-dicarboxyphenoxy)diphenyl propane dianhydride, 3,3',4,4'-perfluoroisopropylidene diphenyl dicarboxylic dianhydride, 2,2',3,3'-diphenyl tetracarboxylic dianhydride, 2,3,3',4'-diphenyl tetracarboxylic dianhydride, 3,3',4,4'-diphenyl tetracarboxylic dianhydride, bis(phthalic acid)phenylsulfinoxide dianhydride, p-phenylene-bis(triphenylphthalic acid) dianhydride, m-phenylene-bis(triphenylphthalic acid)dianhydride, bis(triphenylphthalic acid)-4,4'-diphenylether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), 2,2-bis(4-hydroxyphenyl)propane-bis(anhydrotrimellitate), 2,3,4,5-tetrahydrofuran tetracarboxylic dianhydride, 1,3,3a,4,5,9b-hexahydro-5-(tetrahydro-2,5-dioxofuran-3-yl)naphtho[1,2-c]furan-1,3-dione, 1,3,3a,4,5,9b-hexahydro-5-methyl-5-(tetrahydro-2, 5-dioxofuran-3-yl)naphtho[1,2-c]furan-1,3-dione, 1,3,3a,4,5,9b-hexahydro-5-ethyl-5-(tetrahydro-2, 5-dioxofuran-3-yl)naphtho-[1,2-c]furan-1,3-dione, 1,3,3a,4,5,9b-hexahydro-7-methyl-5-(tetrahydro-2,5-dioxofuran-3-yl)naphtho[1,2-c]furan-1,3-dione, 1,3,3a,4,5,9b-hexahydro-7-ethyl-5-(tetrahydro-2, 5-dioxofuran-3-yl)naphtho-[1,2-c]furan-1,3-dione, 1,3,3a, 4,5,9b-hexahydro-8-methyl-5-(tetrahydro-2, 5-dioxofuran-3-yl) naphtho[1,2-c]furan-1,3-dione, 1,3,3a,4, 5,9b-hexahydro-8-ethyl-5-(tetrahydro-2,5-dioxofuran-3-yl) naphtho-[1,2-c]furan-1,3-dione, 1,3,3a,4,5,9b-hexahydro-5, 8-dimethyl-5-(tetrahydro-2, 5-dioxofuran-3-yl)naphtho [1,2-c]furan-1,3-dione, 5-(2,5-dioxotetrahydrofuranyl)-3-methyl-3-cyclohexene-1,2-dicarboxylic dianhydride or the like.

The tetracarboxylic dianhydride compound having a structure of formula (IV-1) to formula (IV-6) shown as following:

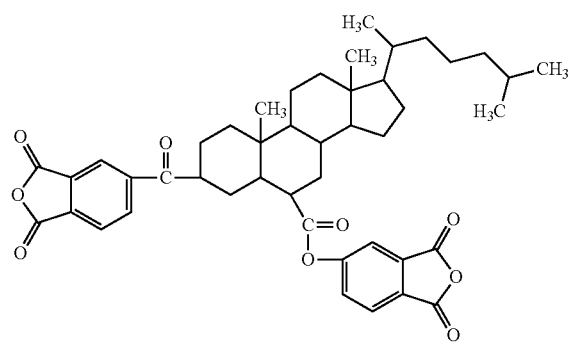

(IV-1)

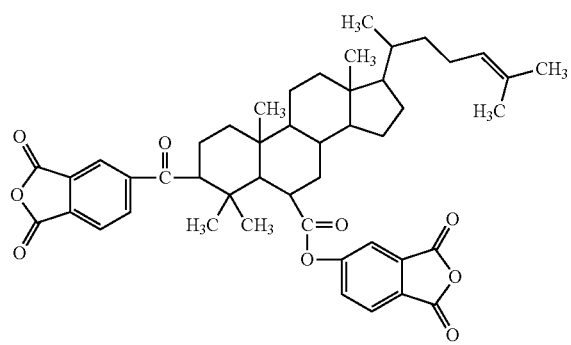

(IV-2)

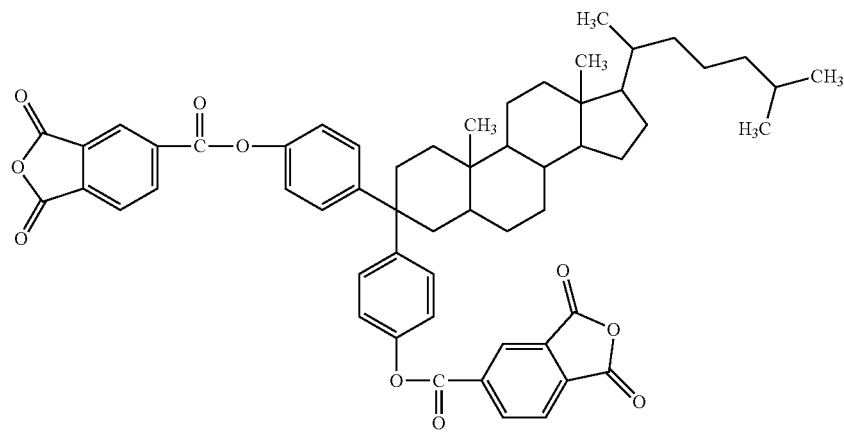

(IV-3)

(IV-4)

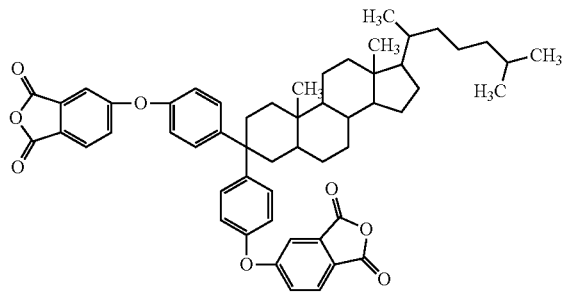

(IV-5)

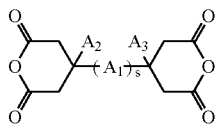

in the formula (VI-5), $A_1$ represents a divalent group containing an aromatic ring; $A_2$ and $A_3$ can be the same or different, and $A_2$ and $A_3$ can each independently represent a hydrogen atom or an alkyl group; and s represents an integer of 1 to 2. The tetracarboxylic dianhydride compound represented by formula (IV-5) is preferably a compound having a structure of formula (IV-5-1) to formula (IV-5-3):

(IV-5-1)

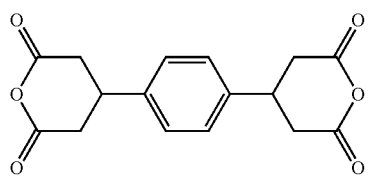

(IV-5-2)

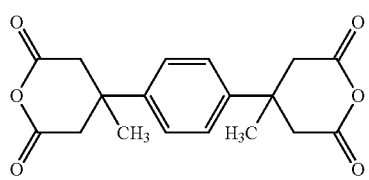

(IV-5-3)

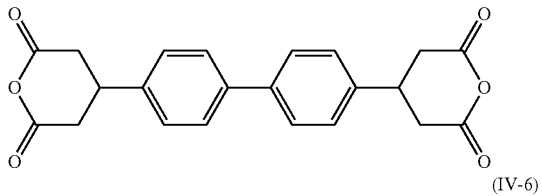

(IV-6)

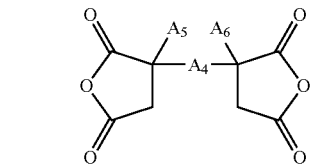

in the formula (IV-6), $A_4$ represents a divalent group containing an aromatic ring; $A_5$ and $A_6$ can be the same or different, and $A_5$ and $A_6$ each independently represent a hydrogen atom or an alkyl group. The tetracarboxylic dianhydride compound represented by formula (IV-6) is preferably a compound having a structure of formula (IV-6-1):

(IV-6-1)

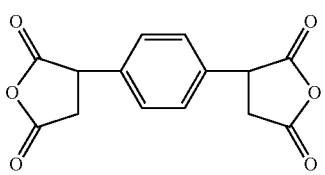

The tetracarboxylic dianhydride compound (a) preferably includes but be not limited to 1,2,3,4-cyclobutane tetracarboxylic acid dianhydride, 1,2,3,4-cyclopentane tetracarboxylic acid dianhydride, 2,3,5-tricarboxycyclopentylacetic acid dianhydride, 1,2,4,5-cyclohexane tetracarboxylic acid dianhydride, 3,4-dicarboxy-1,2,3,4-tetrahydro-1-naphthalene succinic acid dianhydride, pyromellitic dianhydride, 3,3',4,4'-benzophenone tetracarboxylic dianhydride, 3,3',4,4'-biphenylsulfone tetracarboxylic dianhydride or the like. The tetracarboxylic dianhydride compound (a) can be used alone or in a combination thereof.

Diamine Compound (b)

The diamine compound (b) of the present invention includes at least one diamine (b-1) having a structure of formula (I), at least one diamine (b-2) having a structure of formula (II) and an other diamine (b-3).

Diamine (b-1)

The diamine (b-1) of the present invention can have a structure of following formula (I):

(I)

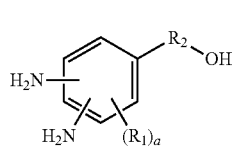

In the formula (I), $R_1$ respectively represents a linear or branched alkyl group of 1 to 6 carbons, a linear or branched hydroxyl alkyl group of 1 to 6 carbons, an alkoxy group of 1 to 6 carbons, an alkylthio group of 1 to 6 carbons, a halogen atom, an amino group or a nitro group; $R_2$ represents a methylene group, a divalent alkyl group of 2 to 10 carbons, a divalent alkenyl group of 2 to 7 carbons or a divalent alkynyl group of 2 to 6 carbons; and a represents an integer of 0 to 3.

For example, the linear or branched alkyl group of 1 to 6 carbons can include but be not limited to methyl, ethyl, propyl, iso-propyl, n-butyl or the like; preferably methyl, ethyl or iso-propyl group. The linear or branched hydroxyl alkyl group of 1 to 6 carbons can include but be not limited to hydroxyl hexyl; hydroxyl pentyl; hydroxyl butyl; hydroxyl propyl such as 1-hydroxyl propyl, 2-hydroxyl propyl, 3-hydroxyl propyl, 1-hydroxyl iso-propyl or 2-hydroxyl iso-propyl; hydroxyl ethyl such as 1-hydroxyl ethyl or 2-hydroxyl ethyl; hydroxyl methyl or the like. The alkoxy group of 1 to 6 carbons can include but be not limited to methoxyl, ethoxyl, iso-propoxyl, iso-butoxyl, sec-butoxyl, tert-butoxyl, hexoxyl group or the like; preferably the methoxyl group. The alkylthio group of 1 to 6 carbons can include but be not limited to methylthio, ethylthio, propylthio, iso-propylthio, butylthio, iso-butylthio, sec-butylthio, tert-butylthio, pentylthio, hexylthio group or the like; preferably the alkylthio group of 1 to 4 carbons, and more preferably the alkylthio group of 1 to 2 carbons, further preferably the methylthio group.

For example, the divalent alkyl group of 2 to 10 carbons can include but be not limited to methyl methylene, dimethyl methylene, ethyl methylene, ethylene, methyl ethylene, n-propylene, iso-propylene, n-butylene, sec-butylene, iso-butylene, tert-butylene, n-pentylene, neopentylene, n-hexylene, 3-methyl hexylene, 2,2-dimethyl pentylene, 2,3-dimethyl pentylene, n-heptylene, n-octylene, n-nonylene, n-decylene or the like. The alkenyl group of 2 to 7 carbons can include but be not limited to propenylene, iso-propenylene, dipropenyl methylene or the like. The alkynyl group of 2 to 6 carbons can include but be not limited to methyl butynylene or the like.

For example, the diamine (b-1) having a structure of formula (I) can include but be not limited to 2,5-diamino-4-fluoro-benzenemethanol, 3-(3,4,5-triaminophenyl)-2-propen-1-ol, 4,5-diamino-2-bromo-benzenemethanol, 2,5-diamino-3,4-dimethoxy-benzenemethanol, 4, 5-diamino-2,3-difluoro-benzenemethanol, 2,4-diamino-5-methoxy-benzenemethanol, 4,5-diamino-2-chloro-benzenemethanol, 4,5-diamino-2-fluoro-benzenemethanol, 3,4-diamino-2-fluoro-α,α-dimethyl-benzenemethanol, 2,4-diamino-benzenemethanol, 3,4-diamino-benzeneethanol, 3,5-diamino-4-methyl-benzenemethanol, 3,5-diamino-2-methyl-benzenemethanol, 3,4-diamino-α,α-di-2-propen-1-yl-benzenemethanol, 2,5-diamino-$\alpha^1,\alpha^1,\alpha^3,\alpha^3$-tetramethyl-1,3-benzenedimethanol, 2,5-diamino-1,3-benzenedimethanol, 2,5-diamino-3-methyl-benzeneethanol, 2,5-diamino-α,3-dimethyl-benzenemethanol, 2,5-diamino-3-methyl-benzenemethanol, 4,6-diamino-1,3-benzenedimethanol, 2,4-diamino-α-methyl-benzenemethanol, 2,4,6-triamino-benzeneethanol, 4,6-diamino-1,3-benzenediethanol, 2,5-diamino-α-methyl-benzenemethanol, 3-(2,5-diaminophenyl)-2-propen-1-ol, 2,5-diamino-β-methylene-benzeneethanol, 2,5-diamino-α-ethyl-benzenemethanol, 3,4-diamino-benzenemethanol, 3, 5-diamino-2,4,6-triiodo-benzeneethanol, 2,5-diamino-4-methyl-benzenemethanol, 2,5-diamino-4-(methylthio)-benzeneethanol, 2,5-diamino-4-chloro-benzeneethanol, 3,5-diamino-α-methyl-benzenemethanol, 3,5-diamino-2,4,6-triiodo-benzenemethanol, 2,5-diamino-benzeneethanol, 2,5-diamino-α-methyl-benzeneethanol, 2,4-diamino-benzeneethanol, 2,4-diamino-α-methyl-benzeneethanol, 3,5-diamino-benzeneethanol, 2,5-diamino-α-methyl-3-nitro-benzeneethanol, 2,5-diamino-3-nitro-benzeneethanol, 4-(3,4-diaminophenyl)-2-methyl-3-butyn-2-ol, 2,5-diamino-benzenemethanol, 2,5-diamino-benzenepropanol, 3,5-diamino-4-methoxy-benzenemethanol, 4,6-diamino-$\alpha^1,\alpha^1,\alpha^3,\alpha^3$-tetramethyl-1,3-benzenedimethanol, 3,5-diamino-benzenemethanol, 3,4-diamino-α-methyl-benzenemethanol, 2,4-diamino-4-methoxy-benzeneethanol or the like.

The aforementioned diamine (b-1) can be used alone or in a combination thereof.

Preferably, the diamine (b-1) having a structure of formula (I) can include 3-(3,4,5-triaminophenyl)-2-propen-1-ol, 2,5-diamino-α-ethyl-benzenemethanol, 2,5-diamino-benzeneethanol, 2,4-diamino-5-methoxy-benzenemethanol, 4,5-diamino-2-bromo-benzenemethanol, 4,6-diamino-1,3-benzenediethanol, 2,5-diamino-3-methyl-benzeneethanol or 3,4-diamino-benzeneethanol.

Based on a total amount of the diamine compound (b) as 100 moles, an amount of the diamine (b-1) having a structure of formula (I) is 5 moles to 40 moles, preferably 5 moles to 35 moles, and more preferably 10 moles to 35 moles. When the diamine compound (b) of the polymer composition (A) does not include the diamine (b-1) having a structure of formula (I), the liquid crystal display element has poor reliability and response velocity of a liquid crystal.

Diamine (b-2)

The diamine (b-2) of the invention can include a diamine having a photoreactive structure. The photoreactive structure is preferably a structure having at least one reaction function selected from isomerization and dimerization through light irradiation.

The diamine (b-2) can have a structure of formula (II):

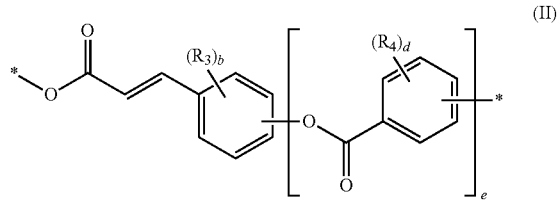

in the formula (II), $R_3$ and $R_4$ respectively represent an alkyl group of 1 to 6 carbons, an alkoxy group of 1 to 6 carbons, a halogen atom and a cyano group; b and d respectively represent an integer of 0 to 4; e represents 0 or 1; and * respectively represent a bonding position.

The diamine (b-2) having a structure of formula (II) can include a compound having a structure of formula (II-1), a compound having a structure of formula (II-2) or a combination thereof:

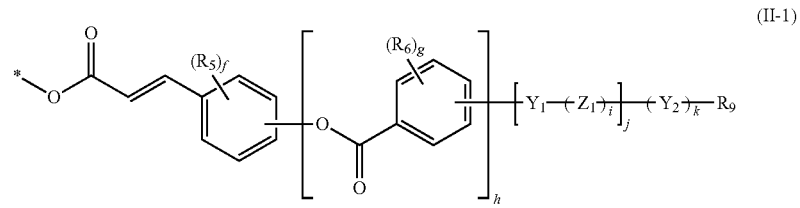

(II-2)

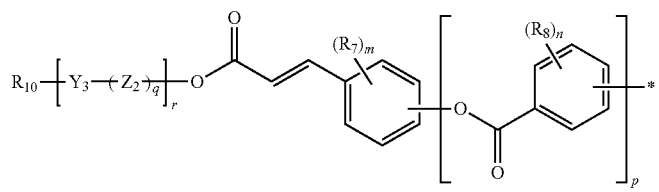

in the formula (II-1) and formula (II-2), $R_5$, $R_6$, $R_7$ and $R_8$ respectively represent an alkyl group of 1 to 6 carbons, an alkoxy group of 1 to 6 carbons, a halogen atom or a cyano group; $R_9$ and $R_{10}$ respectively represent an alkyl group of 1 to 40 carbons or a chloride-substituted alkyl group of 1 to 40 carbons; $Y_1$, $Y_2$ and $Y_3$ respectively represent

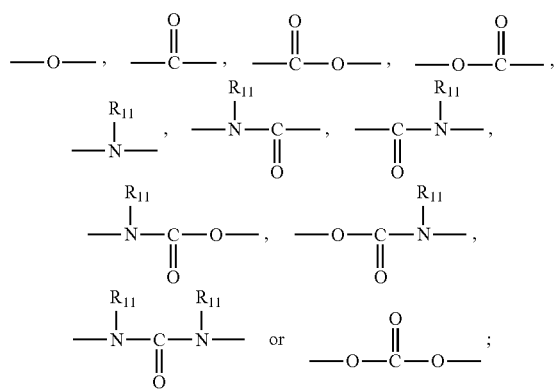

$R_{11}$ represents a hydrogen atom or an alkyl group of 1 to 4 carbons; $Z_1$, and $Z_2$ respectively represent a methylene group, an arylene group, a divalent alicyclic group, —Si (CH$_3$)$_2$—, —CH=CH—, —C≡C—, a methylene group having a substituent, an arylene group having a substituent, a divalent alicyclic group having a substituent, —Si(CH$_3$)$_2$— having a substituent, or —CH=CH— having a substituent, and the substituent is a cyano group, a halogen atom, or an alkyl group of 1 to 4 carbons; f, g, m and n respectively represent an integer of 0 to 4; h and p respectively represent 0 or 1; i and q respectively represent an integer of 1 to 6; j and r respectively represent an integer of 0 to 2; k represents 0 or 1; when i, j, k, q or r is bigger than 1, a plurality of $Y_1$, $Y_2$, $Y_3$, $Z_1$ or $Z_2$ can be the same or different; and * respectively represent a bonding position.

The fluorine-substituted alkyl group of 1 to 40 carbons can be an alkyl group of 1 to 40 carbons and a portion or all of the hydrogen atoms in the alkyl group are substituted by fluorine atoms. Preferably, the aforementioned $R_9$ and $R_{10}$ respectively represent an alkyl group of 1 to 20 carbons, and a portion or all of the hydrogen atoms in the alkyl group are substituted by fluorine atoms.

In the fluorine-substituted alkyl group of 1 to 40 carbons, the alkyl group can include but be not limited to n-pentyl, n-hexyl, n-heptyl, n-octyl, n-nonyl, n-decyl, n-lauryl, n-dodecyl, n-tridecyl, n-tetradecyl, n-pentadecyl, n-hexadecyl, n-heptadecyl, n-octadecyl, n-nonadecyl, n-eicosyl, 4,4,4-trifluorobutyl, 4,4,5,5,5-pentafluoropentyl, 4,4,5,5,6,6,6-heptafluorohexyl, 3,3,4,4,5,5,5-heptafluoropentyl, 2,2,2-trifluoroethyl, 2,2,3,3,3-pentafluoropropyl, 2-(perfluorobutyl) ethyl, 2-(perfluorooctyl)ethyl, 2-(perfluorodecyl)ethyl or the like.

Preferably, the fluorine-substituted alkyl group of 1 to 40 carbons can be a straight-chain or branched-chain fluoroalkyl group of 1 to 16 carbons. In the viewpoint of enhancing the alignment property of the liquid crystal, the straight-chain or branched-chain fluoroalkyl group of 1 to 16 carbons can be preferably a straight-chain fluoroalkyl group of 1 to 8 carbons, and more preferably a straight-chain fluoroalkyl group of 3 to 6 carbons.

For example, the straight-chain or branched-chain fluoroalkyl group of 1 to 16 carbons can include but be not limited to 2,2,2-trifluoroethyl, 3,3,3-trifluoro-n-propyl, 4,4,4-trifluoro-n-butyl, 4,4,5,5,5-pentafluoro-n-pentyl, or 4,4,5,5,6,6,6-heptafluorohexyl, and more preferably 2,2,2-trifluoroethyl, 3,3,3-trifluoro-n-propyl, 4,4,4-trifluoro-n-butyl, or 4,4,5,5,5-pentafluoro-n-pentyl.

The diamine (b-2) having a photoreactive structure only needs to have 1 photoreactive structure, or equal to or more than 2 photoreactive structures, and preferably 1 or 2 photoreactive structures.

For example, the compound having a structure of formula (II-1) can include a compound shown as following formula (II-1-1) to formula (II-1-25):

(II-1-1)

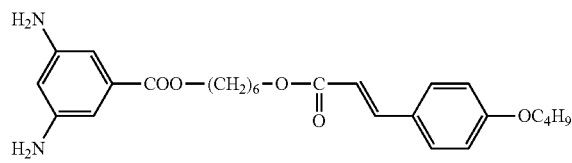

(II-1-2)

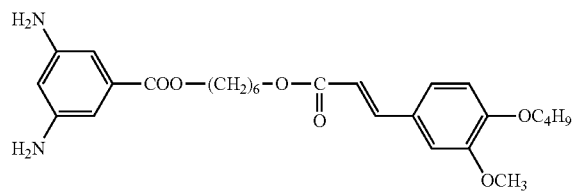

-continued
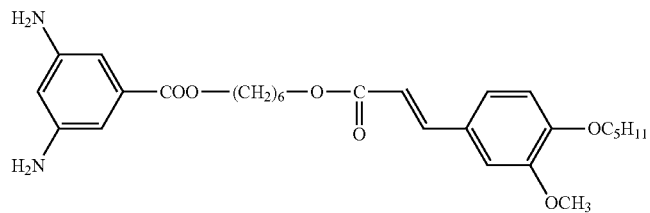
(II-1-3)
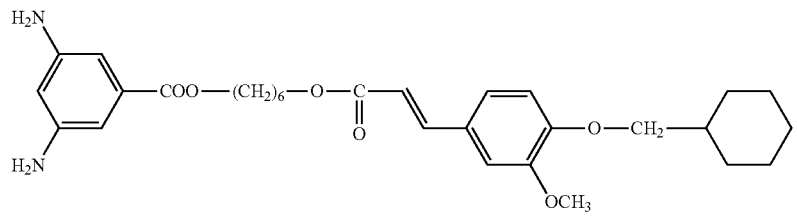
(II-1-4)
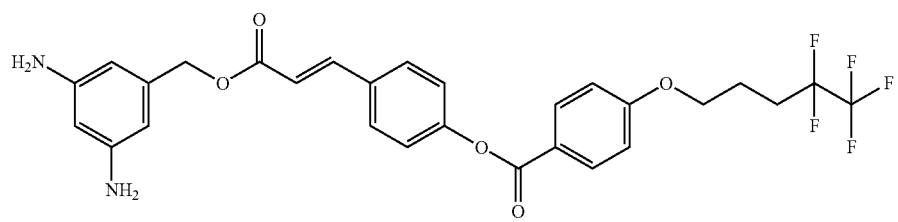
(II-1-5)
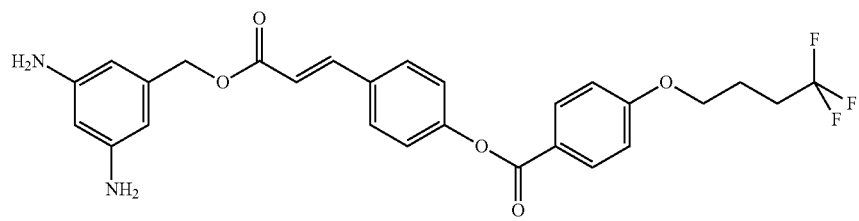
(II-1-6)
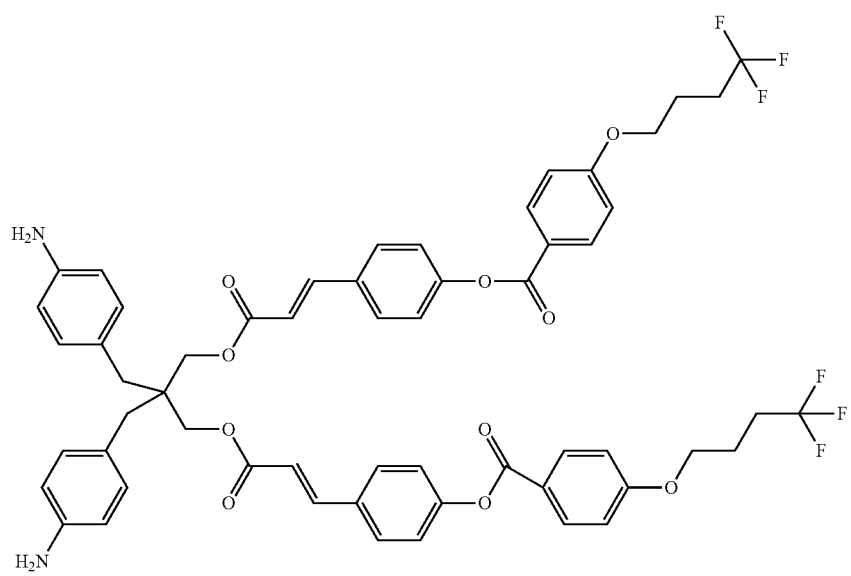
(II-1-7)
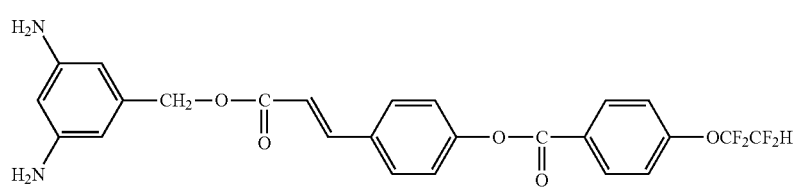
(II-1-8)

(II-1-9)
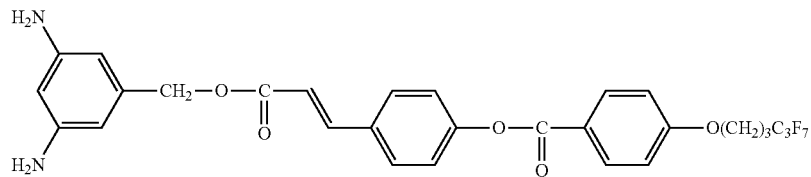
(II-1-10)
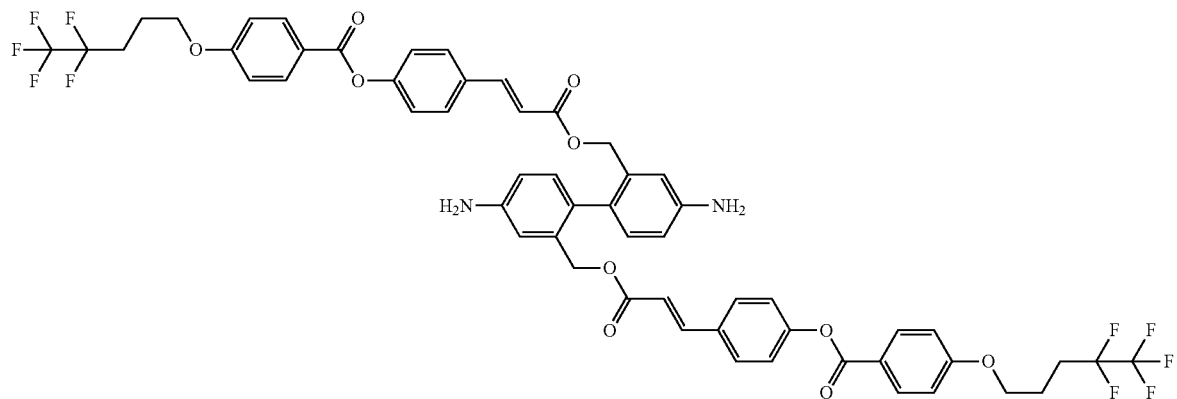
(II-1-11)
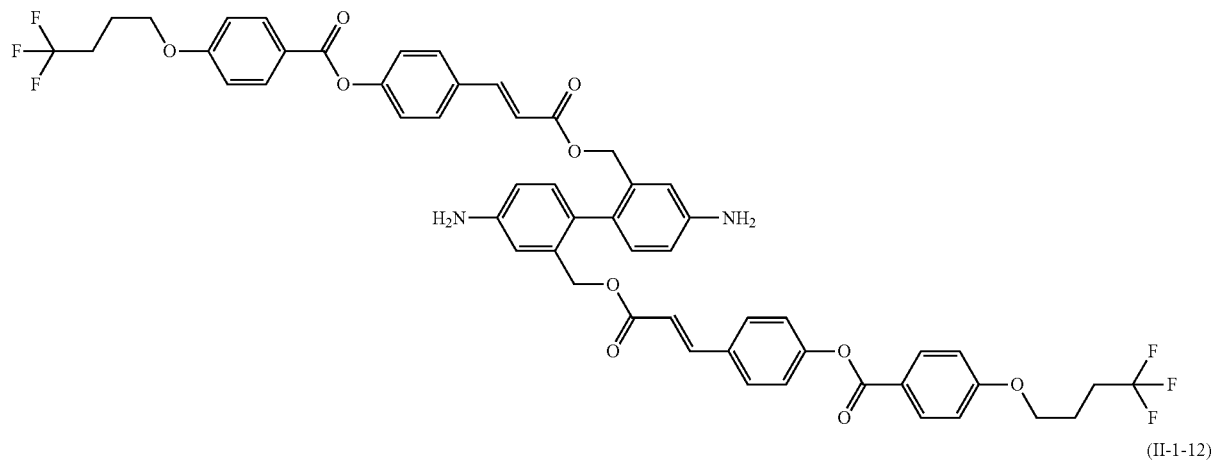
(II-1-12)
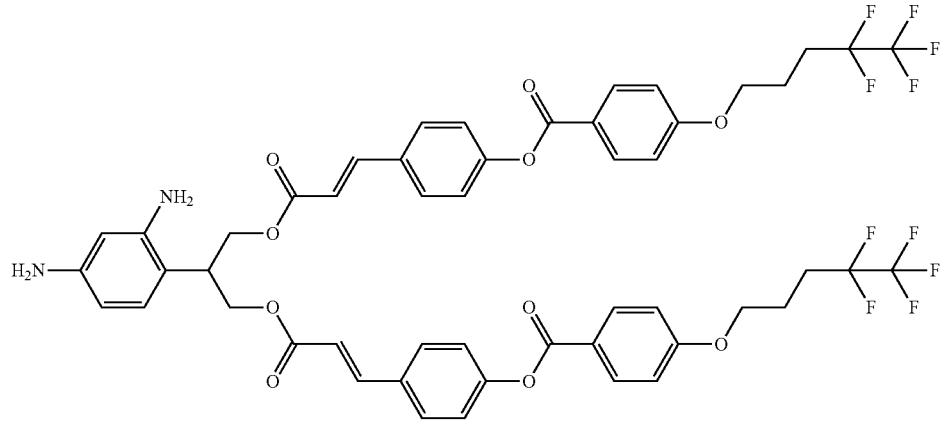

-continued
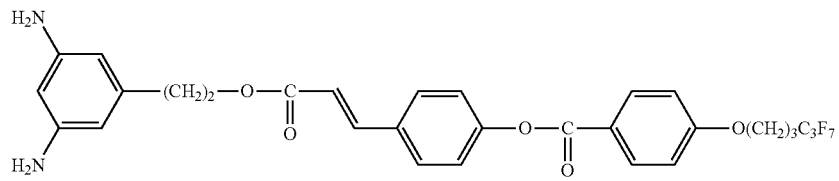
(II-1-13)
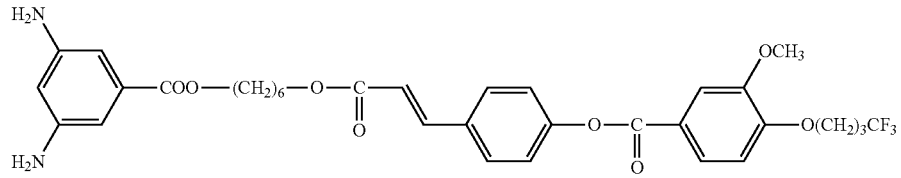
(II-1-14)
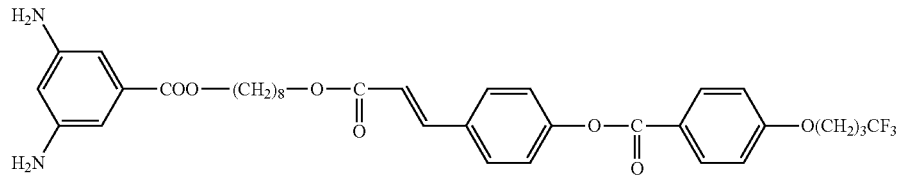
(II-1-15)
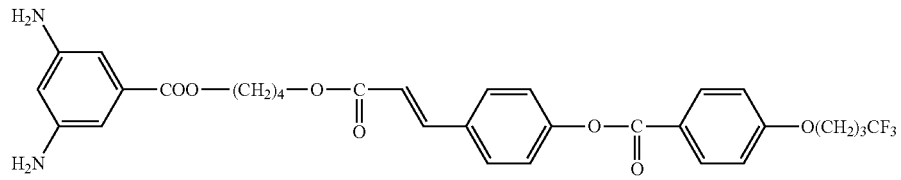
(II-1-16)
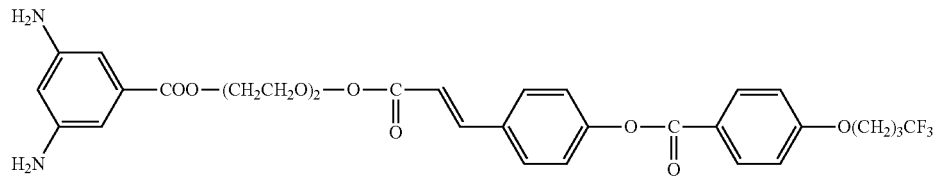
(II-1-17)
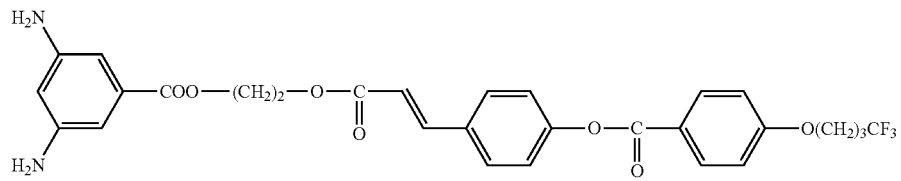
(II-1-18)
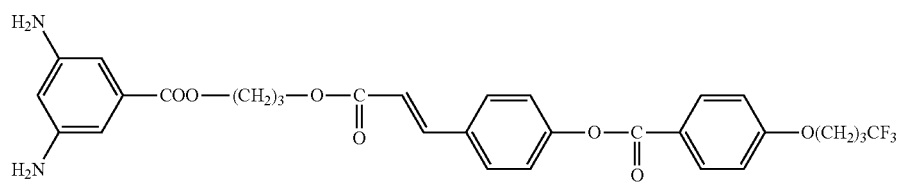
(II-1-19)
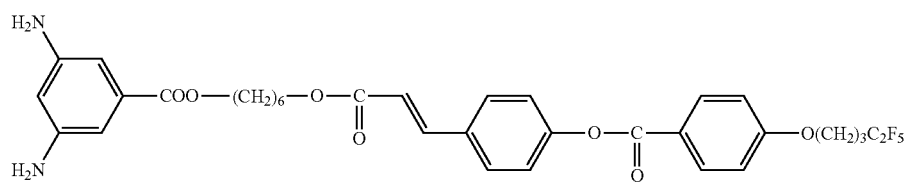
(II-1-20)

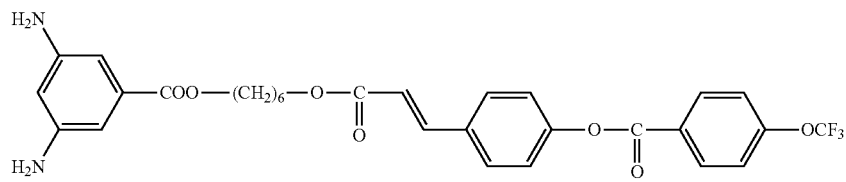
(II-1-21)

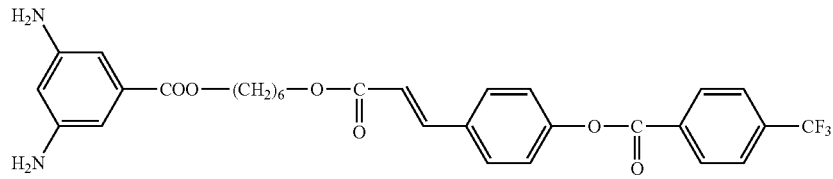
(II-1-22)

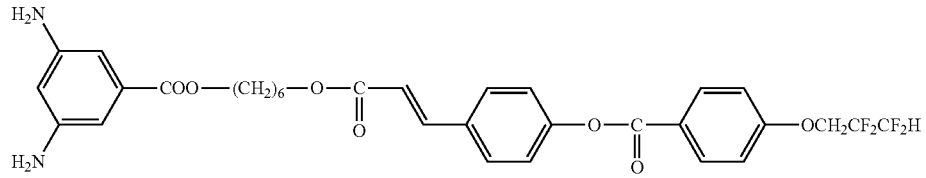
(II-1-23)

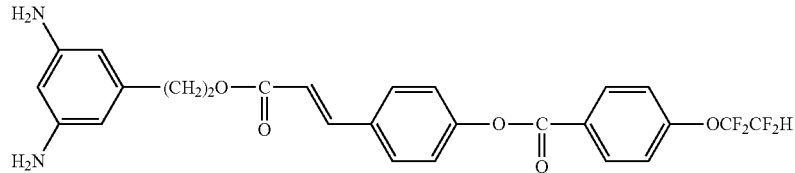
(II-1-24)

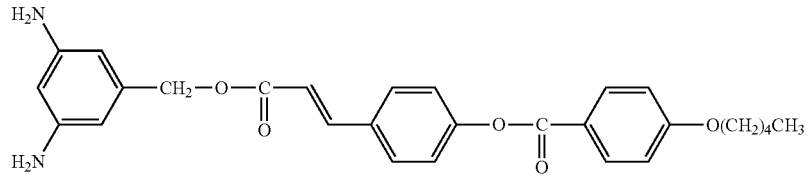
(II-1-25)

For example, the compound having a structure of formula (II-2) can include a compound shown as following formula (II-2-1) or formula (II-2-2):

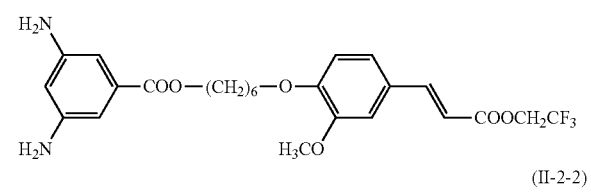
(II-2-1)

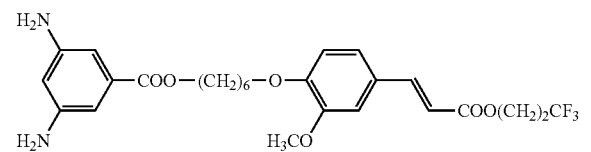
(II-2-2)

Preferably, the diamine (b-2) can include diamine shown as formula (II-1-3), formula (II-1-6), formula (II-1-7), formula (II-2-1) or a combination thereof.

Based on a total amount of the diamine compound (b) as 100 moles, an amount of the diamine (b-2) having a structure of formula (II) is 30 moles to 70 moles, preferably 35 moles to 70 moles, and more preferably 35 moles to 65 moles. When the diamine compound (b) does not include the diamine (b-2) having a structure of formula (II), the liquid crystal display element has poor reliability and response velocity of a liquid crystal.

A molar ratio [(b-1)/(b-2)] of the diamine (b-1) having a structure of formula (I) to the diamine (b-2) having a structure of formula (II) can be 0.1 to 1.2, preferably 0.2 to 1.2, and more preferably 0.2 to 1.1.

When the molar ratio [(b-1)/(b-2)] is 0.1 to 1.2, the liquid crystal display element has better reliability.

Other Diamine (b-3)

Specific examples of the other diamine (b-3) can include but be not limited to 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-diaminoheptane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,11-diaminododecane, 1,12-diaminooctadecane, 1,2-bis(3-aminopropoxy)ethane, 4,4'-diamino dicyclohexylmethane, 4,4'-diamino-3,3'-dimethyldicyclohexylamine, 1,3-diamino cyclohexane, 1,4-diaminocyclohexane, isophorone diamine, tetrahydro dicyclopentadiene diamine, tricyclo[6.2.1.0$^{2,7}$]-undecylenedimethyldiamine, 4,4'-methylenebis(cyclohexylamine), 4,4'-diaminodiphenylmethane, 4,4'-diamino diphenylethane, 4,4'-diaminodiphenylsulfone, 4,4'-diaminobenzanilide, 4,4'-diaminodiphenyl ether, 3,4'-diaminodiphenyl ether, 1,5-diaminonaphthalene, 5-amino-1-(4'-aminophenyl)-1,3,3-trim ethyl indane, 6-amino-1-(4'-aminophenyl)-1,3,3-trimethyl indane, hexahydro-4,7-methanoindanylenedimethylenediamine, 3,3'-diamino benzophenone, 3,4'-diamino benzophenone, 4,4'-diamino benzophenone, 2,2-bis[4-(4-aminophenoxyl)phenyl]propane, 2,2-bis[4-(4-amino phenoxyl)phenyl]hexafluoropropane, 2,2-bis(4-aminophenyl)hexafluoropropane, 2,2-bis[4-(4-aminophenoxyl)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 9,10-bis(4-aminophenyl)-10-hydroanthracene, 2,7-diaminofluorene, 9,9-bis(4-aminophenyl)fluorene, 4,4'-methylene-bis(2-chloroaniline), 4,4'-(p-phenylene isopropylidene)bisaniline, 4,4'-(m-phenylene isopropylidene)bisaniline, 2,2'-bis[4-(4-amino-2-trifluoro methylphenoxy)phenyl]hexafluoropropane, 4,4'-bis[(4-amino-2-trifluoromethyl) phenoxy]-octafluorobiphenyl, 5-[4-(4-n-pentylcyclohexyl)cyclohexyl]phenyl methylene-1,3-diaminobenzene, 1,1-bis[4-(4-aminophenoxyl)phenyl]-4-(4-ethyl phenyl)cyclohexane, or other diamine having a structure of formula (III-1) to formula (III-25).

The other diamine having a structure of formula (III-1) to formula (III-25) shows as the following:

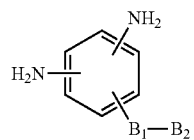
(III-1)

in the formula (III-1), $B_1$ represents

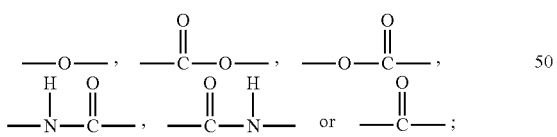

$B_2$ represents a steroid-containing group, a trifluoromethyl group, a fluorine group, an alkyl group of 2 to 30 carbons, or a monovalent group containing a nitrogen atom ring structure derived from pyridine, pyrimidine, triazine, piperidine, piperazine and the like.

The other diamine having a structure of formula (III-1) can be preferably 2,4-diaminophenyl ethyl formate, 3,5-diaminophenyl ethyl formate, 2,4-diaminophenyl propyl formate, 3,5-diaminophenyl propyl formate, 1-dodecoxy-2,4-diaminobenzene, 1-hexadecoxy-2,4-diaminobenzene, 1-octadecoxy-2,4-diaminobenzene or other diamine shown as following formula (III-1-1) to formula (III-1-4):

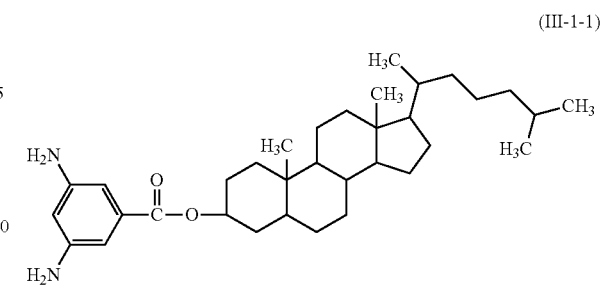
(III-1-1)

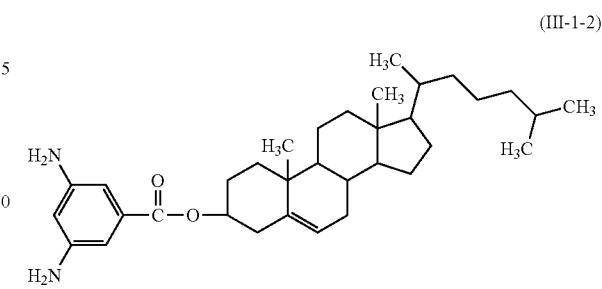
(III-1-2)

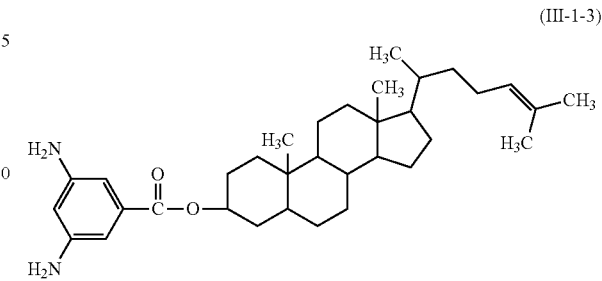
(III-1-3)

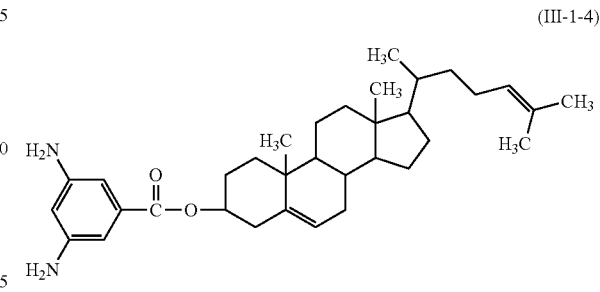
(III-1-4)

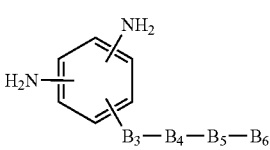
(III-2)

in the formula (III-2), $B_3$ represents

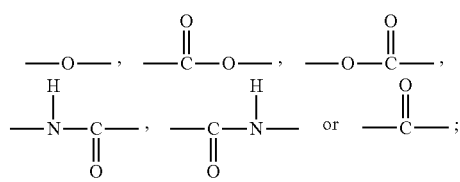

$B_4$ and $B_5$ represent a divalent aliphatic ring, a divalent aromatic ring, or a divalent heterocyclic ring group; $B_6$ represents an alkyl group of 3 to 18 carbons, an alkoxy group of 3 to 18 carbons, a fluoroalkyl group of 1 to 5 carbons, a fluoroalkoxy group of 1 to 5 carbons, a cyano group or a halogen atom.

Preferably, the other diamine having a structure of formula (III-2) can be diamine shown as following formula (III-2-1) to formula (III-2-13):

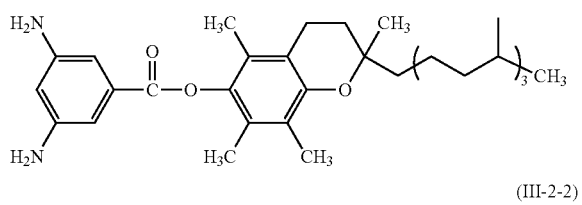
(III-2-1)

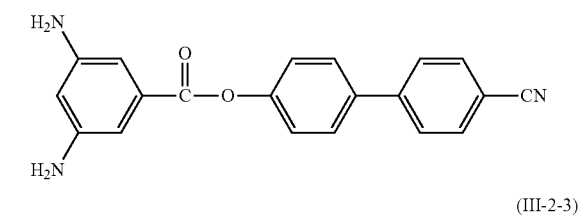
(III-2-2)

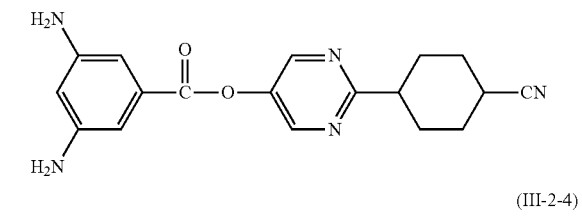
(III-2-3)

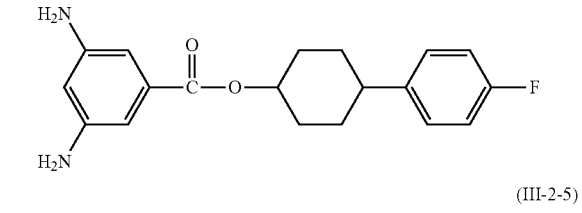
(III-2-4)

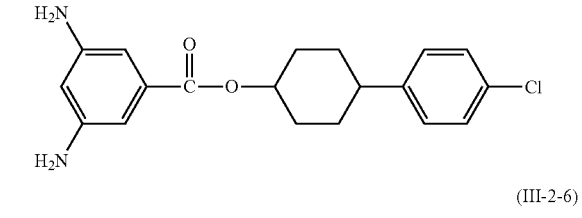
(III-2-5)

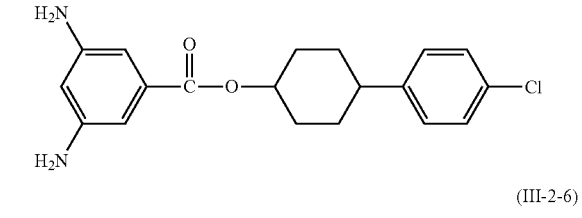
(III-2-6)

(III-2-7)

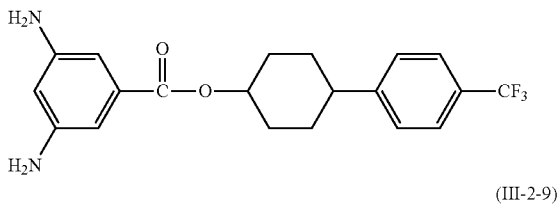
(III-2-8)

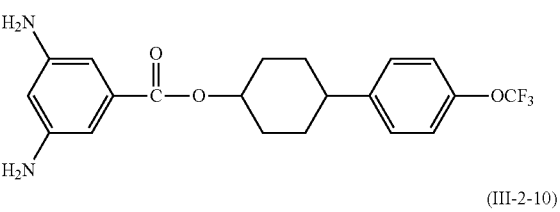
(III-2-9)

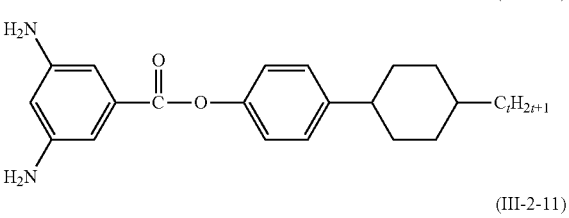
(III-2-10)

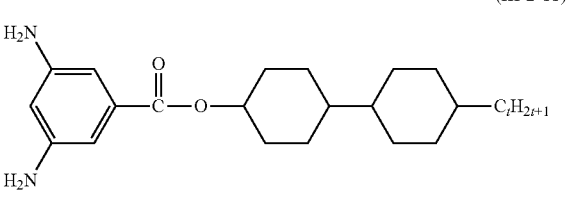
(III-2-11)

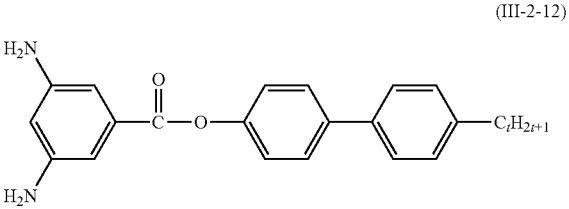
(III-2-12)

(III-2-13)

in the formula (III-2-10) to formula (III-2-13), t represents an integer of 3 to 12.

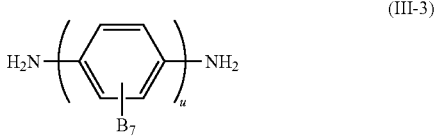
(III-3)

in the formula (III-3), $B_7$ represents a hydrogen atom, an acyl group of 1 to 5 carbons, an alkyl group of 1 to 5 carbons, an alkoxy group of 1 to 5 carbons or a halogen atom, and $B_7$ of every repeating units can be the same or different; u is an integer of 1 to 3.

The diamine shown as formula (III-3) can select from (1) when u is 1: p-diaminobenzene, m-diaminobenzene, o-diaminobenzene, 2,5-diaminotoluene or the like; (2) when u is 2: 4,4'-diamino biphenyl, 2,2'-dimethyl-4,4'-diamino biphenyl, 3,3'-dimethyl-4,4'-diamino biphenyl, 3,3'-dimethoxy-4,4'-diamino biphenyl, 2,2'-dichloro-4,4'-diamino biphenyl, 3,3'-dichloro-4,4'-diamino biphenyl, 2,2',5,5'-tetrachloro-4,4'-diamino biphenyl, 2,2'-dichloro-4,4'-diamino-5,5'-dimethoxy biphenyl, 4,4'-diamino-2,2'-bis(trifluoromethyl) biphenyl or the like; (3) when u is 3: 1,4-bis(4'-aminophenyl)benzene. More preferably, the diamine shown as formula (III-3) can include p-diaminobenzene, 2,5-diaminotoluene, 4,4'-diamino biphenyl, 3,3'-dimethoxy-4,4'-diamino biphenyl or 1,4-bis(4'-aminophenyl)benzene.

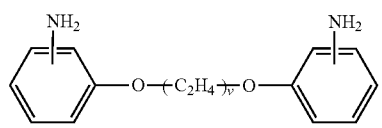

(III-4)

in the formula (III-4), v represents an integer of 2 to 12.

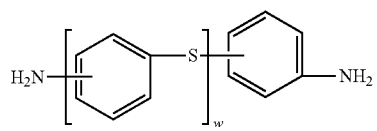

(III-5)

in the formula (III-5), w represents an integer of 1 to 5. The diamine shown as formula (III-5) can select from 4,4'-diaminodiphenylsulfide.

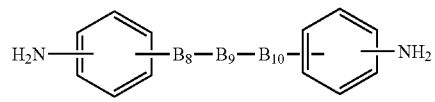

(III-6)

in the formula (III-6), $B_8$ and $B_{10}$ can be the same of different, and $B_8$ and $B_{10}$ respectively represent a divalent organic groups; $B_9$ represents a divalent group containing a nitrogen atom ring structure derived from pyridine, pyrimidine, triazine, piperidine, and piperazine.

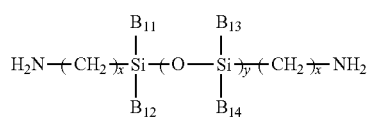

(III-7)

in the formula (III-7), $B_{11}$, $B_{12}$, $B_{13}$ and $B_{14}$ can be the same or different, and $B_{11}$, $B_{12}$, $B_{13}$ and $B_{14}$ can represent a hydrocarbon group of 1 to 12 carbons. y represents am integer of 1 to 3, and x represents an integer of 1 to 20.

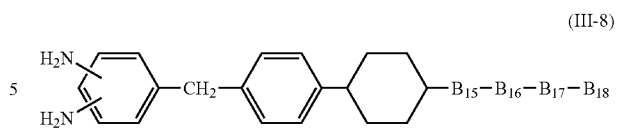

(III-8)

in the formula (III-8), $B_{15}$ represents

or a cyclohexylene group; $B_{16}$ represents a methylene group; $B_{17}$ represents a phenylene group or a cyclohexylene group; and $B_{18}$ represents a hydrogen atom or a heptane group The diamine having a structure of formula (III-8) can be preferably selected from a diamine having a structure of following formula (III-8-1) and formula (III-8-2):

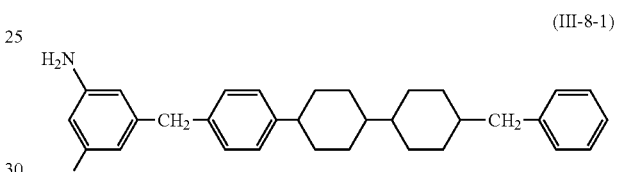

(III-8-1)

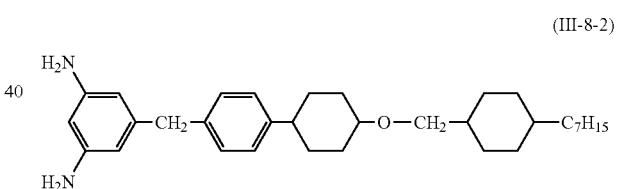

(III-8-2)

The other diamine having a structure of formula (III-9) to formula (III-25) are shown as following:

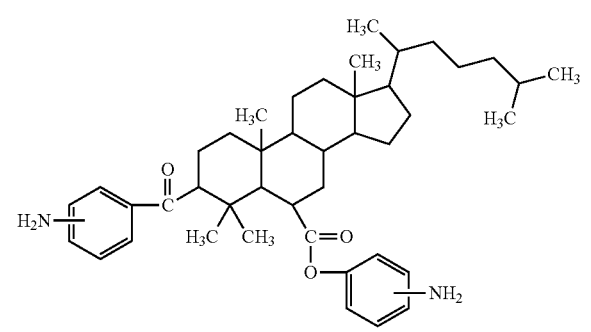

(III-9)

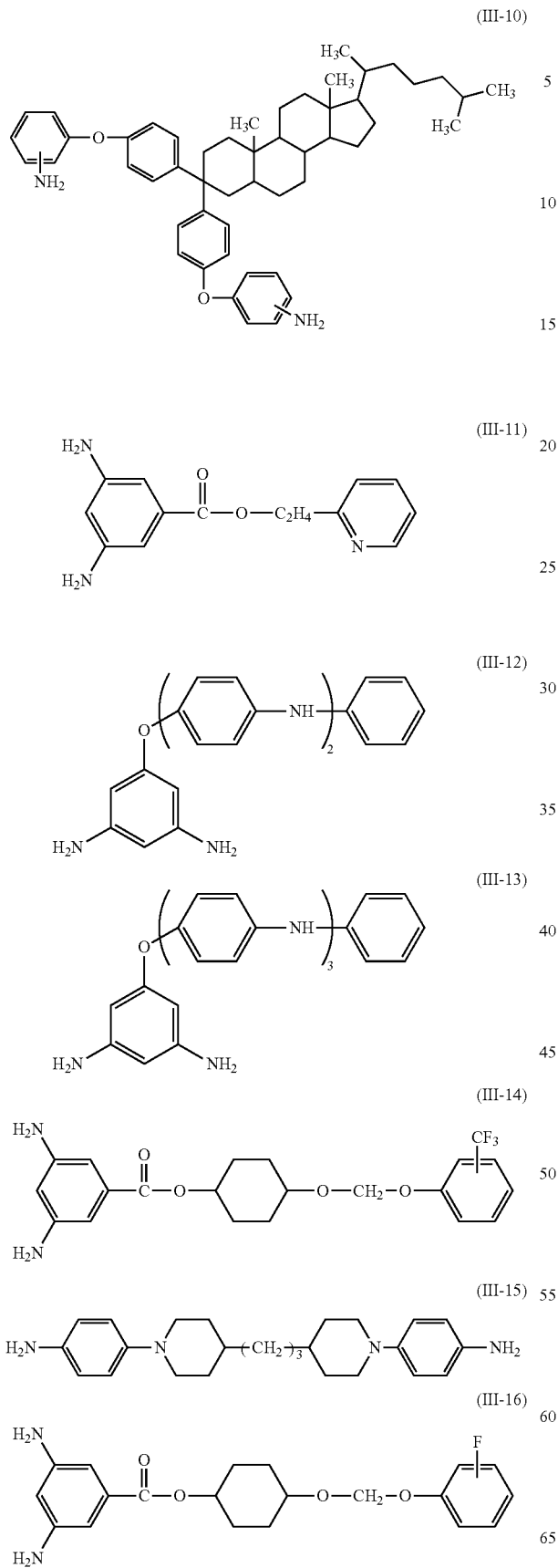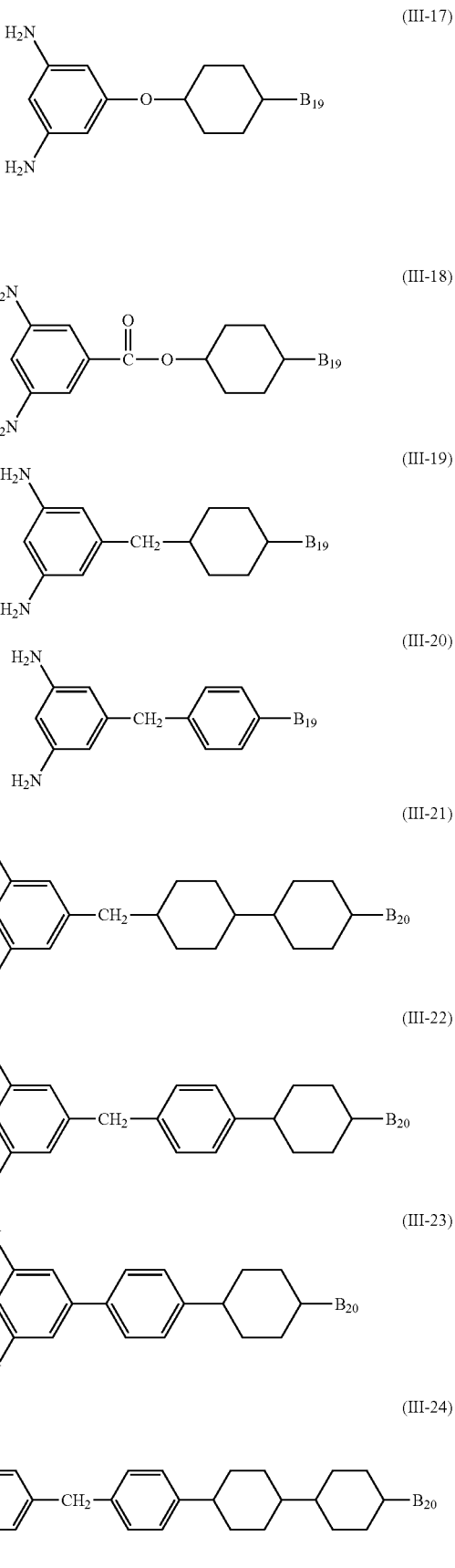

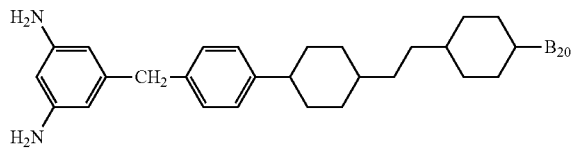

(III-25)

in the formula (III-17) to formula (III-25), $B_{19}$ can be preferably an alkyl group of 1 to 10 carbons or an alkoxy group of 1 to 10 carbons; $B_{20}$ can be preferably a hydrogen atom, an alkyl group of 1 to 10 carbons or an alkoxy group of 1 to 10 carbons.

For example, the other diamine (b-3) can include but be not limited to a diamine having a structure of chalcone, such as 3,3'-diaminochalcone, 4,4'-diaminochalcone, 3,4'-diaminochalcone, 3,4-diaminochalcone or the like; a diamine having a structure of stilbene, such as 3,3'-diaminostilbene, 4,4'-diaminostilbene, 4,4'-diaminostilbene-2,2'-sulfonic acid, 4,4'-bis(4-amino-1-naphthylazo)-2,2'-stilbene sulfonic acid or the like; a diamine having a structure of anthraquinone, such as 1,2-diamino anthraquinone, 1,4-diamino anthraquinone, 1,5-diamino anthraquinone, 1,4-diamino anthraquinone-2,3-dicyano-9,10-anthraquinone or the like; or a diamine having a structure of carbazole, such as 3,6-diaminocarbazole or the like.

Preferably, the other diamine (b-3) can include but be not limited to 1,2-diaminoethane, 4,4'-diaminodicyclohexylmethane, 4,4'-diaminodiphenyl methane, 4,4'-diaminodiphenyl ether, 5-[4-(4-n-pentylcyclohexyl)cyclohexyl]phenylmethylene-1,3-diaminobenzene, 1,1-bis[4-(4-aminophenoxy)phenyl]-4-(4-ethylphenyl)cyclohexane, 2,4-diaminophenyl ethyl formate, 2,2'-dimethyl-4,4'-diamino diphenyl, 4,4'-methylenebis(cyclohexylamine), 1,4-diaminocyclohexane, p-diaminobenzene, m-diaminobenzene, o-diaminobenzene, 3,3'-diaminochalcone, 4,4'-diaminostilbene, or a diamine having a structure of formula (III-1-1), formula (III-1-2), formula (III-2-1), formula (iii-2-11) or formula (III-8-1).

Based on a total amount of the diamine compound (b) as 100 moles, an amount of the other diamine (b-3) is 0 mole to 65 moles, preferably 0 mole to 60 moles, and more preferably 0 mole to 55 moles.

Method of Producing Polymer Composition (A)

Method of Producing Polyamic Acid

A mixture is dissolved in a solvent, and the mixture includes a tetracarboxylic dianhydride compound (a) and a diamine compound (b). A polycondensation reaction is performed at 0° C. to 100° C. After 1 hr to 24 hrs, the aforementioned reacting solution is subjected to a reduced pressure distillation by an evaporator, or the aforementioned reacting solution was poured into a great quantity poor solvent to obtain a precipitate. Then, the precipitate is dried by a method of reduced pressure drying to produce polyamic acid.

Based on the diamine compound (b) as 100 moles, the amount of the tetracarboxylic dianhydride compound (a) preferably 20 moles to 200 moles, and more preferably 30 moles to 120 moles.

The solvent used in the polycondensation reaction can be the same as or different from the solvent in the liquid crystal alignment agent. The solvent used in the polycondensation reaction does not have any special limitations. The solvent needs to dissolve the reactant and the product. Preferably, the solvent includes but is not limited to (1) aprotic solvent, such as N-methyl-2-pyrrolidinone (NMP), N, N-dimethylacetamide, N,N-dimethylformamide, dimethylsulfoxide, γ-butyrolactone, tetramethylurea, hexmethyl phosphoric acid triamino and the like; (2) phenolic solvent, such as m-cresol, xylenol, phenol, halogenated phenol and the like. Based on the mixture as 100 parts by weight, the amount of the solvent used in the polycondensation reaction is preferably 200 to 2000 parts by weight, and more preferably 300 to 1800 parts by weight.

Particularly, in the polycondensation reaction, the solvent can combine with suitable poor solvent. The formed polyamic acid won't precipitate in the poor solvent. The poor solvent can be used alone or in a combination of two or more, and the poor solvent includes but is not limited (1) alcohols, such as methanol, ethanol, isopropanol, cyclohexanol, ethylene glycol, propylene glycol, 1,4-butanediol, triethyleneglycol and the like; (2) ketone, such as acetone, methyl ethyl ketone, methyl isobutyl ketone, cyclohexanone and the like; (3) ester, such as methyl acetate, ethyl acetate, butyl acetate, diethyl oxalate, diethyl malonate, ethylene glycol monoethyl ether acetate and the like; (4) ether, such as diethyl ether, ethylene glycol methyl ether, ethylene glycol ethyl ether, ethylene glycol n-propyl ether, ethylene glycol isopropyl ether, ethylene glycol n-butyl ether, ethylene glycol dimethyl ether, diethylene glycol dimethyl ether and the like; (5) halohydrocarbon, such as dichloromethane, 1,2-dichloro ethane, 1,4-dichloro butane, trichloroethane, chlorobenzene, m-dichlorobenzene and the like; (6) hydrocarbon, such as tetrahydrofuran, hexane, heptane, octane, benzene, toluene, xylene and the like, or a combination thereof. Based on the diamine compound (b) as 100 parts by weight, the amount of the poor solvent is preferably 0 to 60 parts by weight, and more preferably 0 to 50 parts by weight.

Method of Producing Polyimide

A mixture is dissolved in a solvent, and a polymerization reaction is performed to form polyamic acid. The aforementioned mixture includes a tetracarboxylic dianhydride compound (a) and a diamine compound (b). Then, polyamic acid is heated to subject a dehydration ring-closure reaction in the presence of a dehydrating agent and a catalyst. The amic acid group of the polyamic acid is converted to an imide group by the dehydration ring-closure reaction, that is to say imidization, so as to form polyimide.

The solvent used in the dehydration ring-closure reaction can be the same as the solvent in the liquid crystal alignment agent and is not illustrated any more here. Based on polyamic acid as 100 parts by weight, the amount of the solvent used in the dehydration ring-closure reaction is preferably 200 to 2000 parts by weight, and more preferably 300 to 1800 parts by weight.

The operating temperature of the dehydration ring-closure reaction is preferably 40° C. to 200° C. for getting a better imidization ratio of the polyamic acid. More preferably, the aforementioned temperature is 40° C. to 150° C. When the operating temperature of the dehydration ring-closure reaction is lower than 40° C., the reaction is incomplete, thereby lowering the imidization ratio of the polyamic acid. However, when the operating temperature is higher than 200° C., the weight-average molecular weight of the polyimide is lower.

The imidization ratio of the polymer (A) is not greater than 30%, preferably not greater than 20%, and more preferably not greater than 10%.

The dehydrating agent used in the dehydration ring-closure reaction is selected from the group consisting of acid anhydride compound. For example, the acid anhydride compound is acetic anhydride, propionic anhydride, trifluoroacetic anhydride and the like. Based on the polyamic acid as 1 mole, the amount of the dehydrating agent is 0.01 moles to 20 moles. The catalyst used in the dehydration ring-closure reaction is selected from (1) pyridine compound, such as pyridine, trimethyl pyridine, dimethyl pyridine and the like; (2) tertiary amine compound, such as triethyl amine and the like. Based on the dehydrating agent as 1 mole, the amount of the catalyst is 0.5 moles to 10 moles.

Method of Producing Polyimide Series Block Copolymer

The polyimide series block-copolymer is selected from the group consisting of the polyamic acid block-copolymer, polyimide block-copolymer, polyamic acid-polyimide block copolymer and a combination thereof.

Preferably, a starting material is firstly dissolved in a solvent, and a polycondensation reaction is performed to produce the polyimide series block-copolymer. The starting material includes at least one aforementioned polyamic acid and/or at least one aforementioned polyimide, and the starting material further comprises a tetracarboxylic dianhydride compound (a) and a diamine compound (b).

The tetracarboxylic dianhydride compound (a) and the diamine compound (b) in the starting material are the same as the tetracarboxylic dianhydride compound (a) and the diamine compound (b) used in the method of producing aforementioned polyamic acid. The solvent used in the polycondensation reaction is the same as the solvent in the liquid crystal alignment agent and is not illustrated any more here.

Based on the starting material as 100 parts by weight, the solvent used in the polymerization reaction is preferably 200 to 2000 parts by weight, and more preferably 300 to 1800 parts by weight. The operating temperature of the polymerization reaction is preferably 0° C. to 200° C., and more preferably 0° C. to 100° C.

Preferably, the starting material includes but is not limited to (1) two polyamic acid having different terminal groups and different structures; (2) two polyimide having different terminal groups and different structures; (3) the polyamic acid and the polyimide that have different terminal groups and different structures; (4) the polyamic acid, the tetracarboxylic dianhydride compound and the diamine compound, and the structure of the at least one of the tetracarboxylic dianhydride compound and the diamine compound is different from the structures of the tetracarboxylic dianhydride compound and the diamine compound that are used to form the polyamic acid; (5) the polyimide, the tetracarboxylic dianhydride compound and the diamine compound, and the structure of the at least one of the tetracarboxylic dianhydride compound and the diamine compound is different from the structures of the tetracarboxylic dianhydride compound and the diamine compound that are used to form the polyimide; (6) the polyamic acid, the polyimide, the tetracarboxylic dianhydride compound and the diamine compound, and the structure of the at least one of the tetracarboxylic dianhydride compound and the diamine compound is different from the structures of the tetracarboxylic dianhydride compound and the diamine compound that are used to form the polyamic acid or the polyimide; (7) two polyamic acid, tetracarboxylic dianhydride compounds or diamine compounds, and they have different structures; (8) two polyimide, tetracarboxylic dianhydride compounds or diamine compounds, and they have different structures; (9) two polyamic acid and a diamine compounds, and the two polyamic acid have different structures and the terminal groups of the polyamic acid are acetic anhydride groups; (10) two polyamic acid and a tetracarboxylic dianhydride compound, and the two polyamic acid have different structures and the terminal groups of the polyamic acid are amine groups; (11) two polyimide and a diamine compound, and the two polyimide have different structures and the terminal groups of the polyimide are acid anhydride groups; (12) two polyimide and a tetracarboxylic dianhydride compound, and the two polyimide have different structures and the terminal groups of the polyimide are amine groups.

Preferably, the polyamic acid, the polyimide and the polyimide block copolymer can be terminal-modified polymer after adjusting the molecular weight without departing from the efficiency of the present invention. The terminal-modified polymer can improve a coating ability of the liquid crystal alignment agent. When the polymerization reaction of the polyamic acid is performed, a compound having a monofunctional group is added to produce the terminal-modified polymer. The monofunctional group includes but is not limited to (1) monoacid anhydride, such as maleic anhydride, phthalic anhydride, Itaconic anhydride, n-decyl succinic anhydride, n-dodecyl succinic anhydride, n-tetradecyl succinic anhydride, n-hexadecyl succinic anhydride and the like; (2) monoamine compound, such as aniline, cyclohexaylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylmaine, n-hexadecylamine, n-heptadecylamine, n-octadecylamine, n-eicosylamine and the like; (3) monoisocyanate compound, such as phenyl isocyanate, naphthyl isocyanate and the like.

Solvent (B)

The solvent (B) is N-methyl-2-pyrrolidone, γ-butyrolactone, γ-butyrolactam, 4-hydroxyl-4-methyl-2-pentanone, ethylene glycol monomethyl ether, butyl lactate, butyl acetate, methylmethoxypropionate, ethylethoxypropionate, ethylene glycol methyl ether, ethylene glycol ethyl ether, ethylene glycol n-propyl ether, ethylene glycol iso-propyl ether, ethylene glycol n-butyl ether, ethylene glycol isopropyl ether, ethylene glycol n-butyl ether, ethylene glycol dimethyl ether, ethylene glycol ethyl ether acetate, diglycol dimethyl ether, diglycol diethyl ether, diglycol monomethyl ether, diglycol monoethyl ether, diglycol monomethyl ether acetate, diglycol monoethyl ether acetate, N,N-dimethylformamide, N,N-dimethylacetamide and the like. Preferably, the solvent (B) can be N-methyl-2-pyrrolidone, ethylene glycol n-butyl ether, N,N-dimethylacetamide or a combination thereof. The solvent (B) can be used alone or in a combination of two or more.

Based on the total amount of the polymer composition (A) as 100 parts by weight, an amount of the solvent (B) is 500 parts by weight to 2000 parts by weight, is preferably 800 parts by weight to 2000 parts by weight, and more is preferably 800 parts by weight to 1800 parts by weight.

Additive (C)

The liquid crystal alignment agent can selectively include an additive (C) without departing from the efficiency of the present invention. The additive (C) is an epoxy compound or a functional group-containing silane compound. The additive (C) can raise the adhesion between the liquid crystal alignment film and the surface of the substrate. The additive (C) can be used alone or in a combination of two or more.

The epoxy compound includes but is not limited to ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, 2,2-dibromo-neopentyl diglycidyl ether, 1,3,5,6-tetraglycidyl-2,4-hexanediol, N,N,N',N'-tetraglycidyl-m-xylene diamine, 1,3-bis(N,N-diglycidylaminomethyl) cyclohexane, N, N,N',N'-tetraglycidyl-4,4'-diaminodiphenylmethane, N,N-diglycidyl-p-glycidoxy aniline, 3-(N-allyl-N-glycidyl)aminopropyltrimethoxyl silane, 3-(N, N-diglycidyl)aminopropyl trimethoxyl silane and the like.

Based on the polymer (A) as 100 parts by weight, the amount of the epoxy compound is less than 40 parts by weight, and is preferably 0.1 parts by weight to 30 parts by weight.

The functional group-containing silane compound includes but is not limited to 3-aminopropyl trimethoxy silane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyl-dimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylene triamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxysilane, N-phenyl-3-aminopropyl triethoxysilane, N-bis(oxyethylene)-3-aminopropyltrimethoxysilane, N-bis(oxyethylene)-3-aminopropyl-triethoxysilane and the like.

Based on the polymer (A) as 100 parts by weight, the amount of the silane-containing compound is less than 10 parts by weight, and preferably 0.5 parts by weight to 10 parts by weight.

Producing Liquid Crystal Alignment Agent

The liquid crystal alignment agent of the present invention is produced by a conventional mixing method. For example, the tetracarboxylic dianhydride compound (a) and the diamine compound (b) are mixed uniformly to produce the polymer composition (A). Then, the polymer composition (A) is added to the solvent (B) at 0° C. to 200° C. in a mixer until all compositions are mixed uniformly, and the additive (C) is selectively added. Preferably, the solvent (B) is added into the polymer (A) at 20° C. to 60° C.

Preferably, at 25° C., a viscosity of the liquid crystal alignment agent is 15 cps to 35 cps, preferably 17 cps to 33 cps, and more preferably 20 cps to 30 cps.

Producing Liquid Crystal Alignment Film

The liquid crystal alignment agent of the invention is suitable for forming a liquid crystal alignment film through a photo alignment method.

The forming method of the liquid crystal alignment film can include coating the liquid crystal alignment agent on a substrate to form a coating film, and irradiating the coating film with polarized or non-polarized ultraviolet from a direction inclined relative to the coating film surface to provide liquid crystal alignment to the coating film. Alternately, the coating film is irradiated with polarized ultraviolet from a direction perpendicular to the coating film surface to provide liquid crystal alignment to the coating film.

First, the liquid crystal alignment agent of the invention is coated on one side of a transparent conductive film of a substrate on which a patterned transparent conductive film is disposed through a suitable coating method such as a roll coating method, a spin coating method, a printing method, or an ink-jet method. After coating, a pre-bake treatment is performed on the coating surface, and then a post-bake treatment is performed to form a coating film. The purpose of the pre-bake treatment is to volatilize the organic solvent in the pre-coating layer. The pre-bake treatment is performed at 40° C. to 120° C. for 0.1 minutes to 5 minutes. The post-bake treatment is preferably performed at 120° C. to 300° C., and more preferably 150° C. to 250° C. The post-bake treatment is preferably performed for 5 minutes to 200 minutes, and more preferably 10 minutes to 100 minutes. The film thickness of the coating film after post-bake is preferably 0.001 μm, and more preferably 0.005 μm to 0.5 μm.

The substrate can include a glass such as a float glass, a soda-lime glass or the like; or a transparent substrate formed by a polymeric material such as poly(ethylene terephthalate), poly(butylene terephthalate), polyethersulfone, polycarbonate or the like.

The transparent conductive film can include a NESA film formed by $SnO_2$ or an ITO (indium tin oxide) film formed by $In_2O_3$—$SnO_2$. To form the transparent conductive film patterns, a method such as photo-etching or a method in which a mask is used when the transparent conductive film is formed can be used.

When the liquid crystal alignment agent is coated, a functional silane compound, a titanate compound or the like can be pre-coated on the substrate and the transparent conductive film to improve the adhesion between the substrate or transparent conductive film and the coating film.

Then, the liquid crystal alignment is provided by irradiating the coating film with polarized or non-polarized radiation, and the liquid crystal alignment film is formed by the coating film. The radiation can include an ultraviolet and a visible light with a wavelength of 150 nm to 800 nm, and preferably 300 nm to 400 nm. When the radiation used is a polarized light (linearly polarized light or partially polarized light), irradiation can be performed from a direction perpendicular to the coating film surface. Moreover, to provide a pretilt angle, irradiation can also be performed from an inclined angle. Furthermore, when non-polarized radiation is irradiated, irradiation needs to be performed from the direction inclined relative to the coating film surface.

The light source of the radiation exposure can include a low-pressure mercury lamp, a high-pressure mercury lamp, a deuterium lamp, a metal halide lamp, an argon resonance lamp, a xenon lamp, an excimer laser or the like. The ultraviolet with the preferred wavelength can be obtained by using the light sources above with a filter or a diffraction grating.

An exposure amount of the radiation can be preferably 1 $J/m^2$ to 10000 $J/m^2$, and more preferably 10 $J/m^2$ to 3000 $J/m^2$. Besides, when the effect of aligning the liquid crystal is provided by a coating film formed by a conventionally known liquid crystal alignment agent through a photoalignment method, an exposure amount of the radiation is equal to or larger than 10000 $J/m^2$. However, the coating film is formed by the liquid crystal alignment of the present invention, an exposure amount of the radiation is equal to or less than 3000 $J/m^2$, preferably equal to or less than 1000 $J/m^2$, and more preferably equal to or less than 300 $J/m^2$. The liquid crystal alignment film has excellent effect of aligning liquid crystal, thereby decreasing the cost of the liquid crystal display element.

Producing Liquid Crystal Display Element

The liquid crystal display element of the present invention can include the liquid crystal alignment film formed by the liquid crystal alignment agent of the present invention. The liquid crystal display element of the present invention can be made according to the following method.

Two substrates having the aforementioned liquid crystal alignment film are prepared, and a liquid crystal is disposed between the two substrates to make a liquid crystal cell. To make the liquid crystal cell, the following two methods can be provided:

The first method: the two substrates are disposed opposite to each other with a gap (cell gap) in between such that each liquid crystal alignment film is opposite to one another. Then, the peripherals of the two substrates are bonded together with a sealant. Next, the liquid crystal is injected into the cell gap divided by the substrate surfaces and the sealant, and then the injection hole is sealed to obtain the liquid crystal cell;

The second method: it is called ODF (one drop fill) method. First, an ultraviolet curable sealing material is coated on a predetermined portion of one of the two substrates forming the liquid crystal alignment film. Then, the liquid crystal is dropped onto the liquid crystal alignment film, and then the other substrate is bonded such that the liquid crystal alignment films are opposite to each other. Next, the substrate is irradiated by a ultraviolet light, to cure the sealant, thereby forming the liquid crystal cell.

When any one of the aforementioned methods is used, preferably, after the liquid crystal cell is heated to a temperature at which the liquid crystals are in an isotropic phase, the liquid crystal cell is slowly cooled to room temperature to remove the flowing alignment when the liquid crystals are filled.

Next, the outer surface of the liquid crystal cell is bonded a polarizing plate to obtain the liquid crystal display element of the present invention. When the liquid crystal alignment films are parallelly aligned, a liquid crystal display element having a TN-type or STN-type liquid crystal cell can be obtained by adjusting the angle formed by the polarization direction of the linearly polarized radiation irradiated in the two substrates forming the liquid crystal alignment films and the angle between each substrate and polarizing plate. When the liquid crystal alignment films are perpendicularly aligned, by forming the liquid crystal cell, the directions of the easy-to-align axis of the two substrates forming the liquid crystal alignment films are parallel, and then the polarizing plate and the liquid crystal cell are stuck together, such that an angle between the polarization direction thereof and the easy-to-align axis is 45 degrees. As a result, a liquid crystal display element having a vertical alignment-type liquid crystal cell can be formed.

Specific examples of the sealant can include an epoxy resin used as a curing agent and an alumina balls used as a spacer.

Specific examples of the liquid crystal can include a nematic liquid crystal or a smectic liquid crystal.

In the TN-type or STN-type liquid crystal cell, the aforementioned liquid crystal can be preferably a nematic liquid crystal having positive dielectric anisotropy, such as biphenyl-based liquid crystal, phenyl cyclohexane-based liquid crystal, ester-based liquid crystal, terphenyl liquid crystal, biphenyl cyclohexane-based liquid crystal, pyrimidine-based liquid crystal, dioxane-based liquid crystal, bicyclooctane-based liquid crystal, cubane-based liquid crystal or the like. Moreover, the aforementioned liquid crystal can further include cholesteric liquid crystal such as cholesteryl chloride, cholesteryl nonabenzoate, cholesteryl carbonate or the like; chiral agent manufactured by Merck Co. LTD., and the trade name is C-15, CB-15 or the like; or ferroelectric liquid crystal such as p-decyloxybenzylidene-p-amino-2-methyl butyl cinnamate or the like.

Moreover, in the vertical alignment-type liquid crystal cell, the aforementioned liquid crystal can be preferably a nematic liquid crystal having negative dielectric anisotropy, such as dicyanobenzene-based liquid crystal, pyridazine-based liquid crystal, Schiff base-based liquid crystal, azoxy-based liquid crystal, biphenyl-based liquid crystal, phenyl cyclohexane-based liquid crystal or the like.

The polarizing plate used on the outside of the liquid crystal cell can include a polarizing plate formed by a polarizing film (H film) obtained when iodine is absorbed at the same time that polyvinyl alcohol is stretch aligned by clamping with a cellulose acetate protective film, or a polarizing plate formed by the H film itself.

The liquid crystal display element of the present invention formed by the aforementioned method has excellent display performance, and even after prolonged use, the display performance is not worsened.

FIGURE is a side view of a liquid crystal display element according to an embodiment of the present invention. A liquid crystal display element 100 includes a first unit 110, a second unit 120, and a liquid crystal unit 130. The second unit 120 and the first unit 110 are separately disposed, and the liquid crystal unit 130 is disposed between the first unit 110 and the second unit 120.

The first unit 110 includes a first substrate 111, a first conductive film 113, and a first liquid crystal alignment film 115. The first conductive film 113 is located between the first substrate 111 and the first liquid crystal alignment film 115, and the first liquid crystal alignment film 115 is located on one side of the liquid crystal unit 130.

The second unit 120 includes a second substrate 121, a second conductive film 123, and a second liquid crystal alignment film 125. The second conductive film 123 is located between the second substrate 121 and the second liquid crystal alignment film 125, and the second liquid crystal alignment film 125 is located on another side of the liquid crystal unit 130. In other words, the liquid crystal unit 130 is located between the first liquid crystal alignment film 115 and the second liquid crystal alignment film 125.

Materials of the first substrate 111 and the second substrate 121 are selected from a transparent material. The transparent material can include but be not limited to alkali-free glass, soda-lime glass, hard glass (Pyrex glass), quartz glass, polyethylene terephthalate, polybutylene terephthalate, polyethersulfone, polycarbonate or the like applied in the liquid crystal display element. Materials of the first conductive film 113 and the second conductive film 123 are selected from tin oxide ($SnO_2$) or indium oxide-tin oxide ($In_2O_3$—$SnO_2$).

The first liquid crystal alignment film 115 and the second liquid crystal alignment film 125 are respectively the aforementioned liquid crystal alignment film, and the function thereof is subjecting the liquid crystal unit 130 to form a pretilt angle. Moreover, when a voltage is applied to the first conductive film 113 and the second conductive film 123, an electric field can be generated between the first conductive film 113 and the second conductive film 123, and the electric field can drive the liquid crystal unit 130, thereby changing the arrangement of the liquid crystal molecules in the liquid crystal unit 130.

Several embodiments are described below to illustrate the application of the present invention. However, these embodiments are not used for limiting the present invention. For those skilled in the art of the present invention, various variations and modifications can be made without departing from the spirit and scope of the present invention.

BRIEF DESCRIPTION OF THE DRAWINGS

The invention can be more fully understood by reading the following detailed description of the embodiment, with reference made to the accompanying drawings as follows:

FIGURE is a side view of a liquid crystal display element according to an embodiment of the present invention.

DETAILED DESCRIPTION

Producing Polymer Composition (A)

The polymer composition (A) of Synthesis Examples A-1-1 to A-1-10 and Comparative Synthesis Examples A-2-1 to A-2-5 were according to Table 1 and Table 2 as follows.

Synthesis Example A-1-1

A 500 ml four-necked conical flask equipped with a nitrogen inlet, a stirrer, a condenser and a thermometer was purged with nitrogen. Then, 0.4475 g (0.0025 moles, 5 mole %) of 3-(3,4,5-triaminophenyl)-2-propen-1-ol (b-1-1), 7.47 g (0.015 moles, 30 mole %) of the diamine (b-2-1) having a structure of formula (II-1-3), 3.51 g (0.0325 moles, 65 mole %) of p-diaminobenzene (b-3-1) and 80 g of N-methyl-2-pyrrolidinone were mixed uniformly at room temperature. Next, 11.2 g (0.05 moles, 100 mole %) of 2,3,5-tricarboxy-cyclopentylacetic dianhydride (a-1-1) and 20 g of N-methyl-2-pyrrolidinone were added and left to react for 2 hours at room temperature. When the reaction is completed, the reacting solution was poured into 1500 ml of water to precipitate the polymer. The polymer obtained after filtering was repeatedly washed using methanol and filtered thrice, and then placed into a vacuum oven, where drying was carried out at 60° C., thereby obtaining a polymer composition (A-1-1).

Synthesis Examples A-1-2 to A-1-10 and Comparative Synthesis Examples A-2-1 to A-2-5

Synthesis Examples A-1-2 to A-1-10 and Comparative Synthesis Examples A-2-1 to A-2-5 were practiced with the same method as in Synthesis Example A-1-1 by using various kinds or amounts of the components for the polymer composition. The formulations thereof were listed in Table 1 and Table 2 rather than focusing or mentioning them in details.

Producing Liquid Crystal Alignment Agent

Hereinafter, the liquid crystal alignment agents of Examples 1 to 15 and Comparative Examples 1 to 5 were according to Table 3 and Table 4 as follows.

Example 1

100 parts by weight of the polymer composition (A-1-1) was added into 1200 parts by weight of N-methyl-2-pyrrolidinone (hereinafter abbreviated as B-1) and 600 parts by weight of ethylene glycol n-butyl ether (hereinafter abbreviated as B-2) for mixing in a mixer until all compounds were mixed uniformly at room temperature, thereby obtaining the liquid crystal alignment agent of Example 1. The resulted liquid crystal alignment agent was evaluated according to the following evaluation method, and the result thereof was listed as Table 3. The evaluation methods of the reliability and response velocity were described as follows.

Examples 2 to 15 and Comparative Examples 1 to 5

Examples 2 to 15 and Comparative Examples 1 to 5 were practiced with the same method as in Example 1 by using various kinds or amounts of the compositions for the liquid crystal alignment agent. The formulations and detection results thereof were listed in Table 3 and Table 4 rather than focusing or mentioning them in details.

Evaluation Methods

1. Reliability

The liquid crystal films were respectively made by the liquid crystal alignment agents of the aforementioned Examples 1 to 15 and the Comparative Examples 1 to 5, and the liquid crystal display elements having the same were fabricated. Next, the liquid crystal display elements of Examples 1 to 15 and the Comparative Examples 1 to 5 were respectively disposed in an environment with 65° C. and 85% of relative humidity to subjecting to a reliability testing. After 120 hours, voltage holding ratios of the liquid crystal display elements were respectively detected by an electrical measuring machine (manufactured by TOYO Corporation, and the trade name is Model 6254). A voltage of 4 volts was applied for 2 milliseconds. The applied voltage was held for 1667 milliseconds. After the applied voltage was cut off for 1667 milliseconds, the voltage holding ratio was measured, and an evaluation was made according to the following criterion:

⊚: 98%≤voltage holding ratio;
◯: 95%≤voltage holding ratio<98%;
Δ: 92%≤voltage holding ratio<95%;
x: voltage holding ratio≤92%.

2. Response Velocity of Liquid Crystal

The liquid crystal films were respectively made by the liquid crystal alignment agents of the aforementioned Examples 1 to 15 and the Comparative Examples 1 to 5, and the liquid crystal display elements having the same were located into a testing device to detect the response velocity. The testing device includes a polarizing microscope, a photo-detector and a pulse generator. The response velocity of the liquid crystal means a required time (millisecond; msec.) when a voltage is applied to the aforementioned liquid crystal element or not and a transmission ratio of the liquid crystal display element is varied from 10% to 90%. The voltage has a maximum value of 5V for 1 second. The evaluation was made according to the following criterion:

⊚: response velocity≤8 msec.;
◯: 8 msec.<response velocity≤15 msec.;
Δ: 15 msec.<response velocity≤20 msec.;
x: 20 msec.<response velocity.

According to Table 1 to Table 4, when the diamine compound (b) of the polymer composition (A) does not include the diamine (b-1) or the diamine (b-2), the liquid crystal alignment agent has defects of poor reliability and response velocity of a liquid crystal.

Moreover, when the molar ration [(b-1)/(b-2)] of the diamine (b-1) to the diamine (b-2) of the diamine compound (b) is 0.1 to 1.2, the liquid crystal alignment agent has better reliability.

It should be supplemented that, although specific compounds, components, specific reactive conditions, specific processes, specific evaluation methods or specific equipments are employed as exemplary embodiments of the present invention, for illustrating the liquid crystal alignment agent, the liquid crystal alignment film and the liquid crystal display element of the present invention. However, as is understood by a person skilled in the art instead of limiting to the aforementioned examples, the liquid crystal alignment agent, the liquid crystal alignment film and the liquid crystal display element of the present invention also can be manufactured by using other compounds, components, reactive conditions, processes, analysis methods and equipment without departing from the spirit and scope of the present invention.

As is understood by a person skilled in the art, the foregoing preferred embodiments of the present invention are illustrated of the present invention rather than limiting of the present invention. In view of the foregoing, it is intended to cover various modifications and similar arrangements included within the spirit and scope of the appended claims. Therefore, the scope of which should be accorded the broadest interpretation so as to encompass all such modifications and similar structure.

TABLE 1

| Composition (mole %) | | Synthesis Example | | | | | | | | | |
|---|---|---|---|---|---|---|---|---|---|---|---|
| | | A-1-1 | A-1-2 | A-1-3 | A-1-4 | A-1-5 | A-1-6 | A-1-7 | A-1-8 | A-1-9 | A-1-10 |
| Tetracarboxylic Dianhydride Compound (a) | a-1 | 100 | | | 50 | | 100 | | | | 100 |
| | a-2 | | 100 | | 50 | | | 100 | | 100 | |
| | a-3 | | | 100 | | 100 | | | 100 | | |
| Diamine Compound (b) | Diamine (b-1) | b-1-1 | 5 | | | | | | 10 | | | |
| | | b-1-2 | | 10 | | | | | | | | 40 |
| | | b-1-3 | | | 20 | | | | | | 5 | |
| | | b-1-4 | | | | 30 | | | | | | |
| | | b-1-5 | | | | | 40 | | | | | |
| | | b-1-6 | | | | | | 20 | | | | |
| | | b-1-7 | | | | | | | 20 | | | |
| | | b-1-8 | | | | | | | | 15 | | |
| | Diamine (b-2) | b-2-1 | 30 | | | | | | 30 | | | |
| | | b-2-2 | | 40 | | | 50 | | | | 65 | |
| | | b-2-3 | | | 50 | | | 70 | | 20 | | 30 |
| | | b-2-4 | | | | 60 | | | | 20 | | |
| | Diamine (b-3) | b-3-1 | 65 | | | | 10 | | | | 30 | |
| | | b-3-2 | | | | | | 10 | | 15 | | |
| | | b-3-3 | | | | 10 | | | 40 | | | 30 |
| | | b-3-4 | | | 30 | | | | | | | |
| | | b-3-5 | | 50 | | | | | | | | |
| | | b-3-6 | | | | | | | | | 30 | |
| Molar Ratio [(b-1)/(b-2)] | | | 0.17 | 0.25 | 0.40 | 0.50 | 0.80 | 0.29 | 1.00 | 0.38 | 0.08 | 1.33 | a-1-1 2,3,5-tricarboxycyclopentylacetic dianhydride
a-1-2 1,2,3,4-cyclobutane tetracarboxylic dianhydride
a-1-3 pyromellitic dianhydride
b-1-1 3-(3,4,5-triaminophenyl)-2-propen-1-ol
b-1-3 2,5-diamino-α-ethyl-benzenemethanol
b-1-3 2,5-diamino-benzeneethanol
b-1-4 2,4-diamino-5-methoxy-benzenemethanol
b-1-5 4,5-diamino-2-bromo-benzenemethanol
b-1-6 4,6-diamino-1,3-benzenediethanol
b-1-7 2,5-diamino-3-methyl-benzeneethanol
b-1-8 3,4-diamino-benzeneethanol
b-2-1 diamine having a structure of formula (II-1-3)
b-2-2 diamine having a structure of formula (II-1-6)
b-2-3 diamine having a structure of formula (II-2-1)
b-2-4 diamine having a structure of formula (II-1-7)
b-3-1 p-diaminobenzene
b-3-2 2,2'-dimethyl-4,4'-diamino biphenyl
b-3-3 4,4'-methylenebis(cyclohexylamine)
b-3-4 1,4-diaminocyclohexane
b-3-5 3,3'-diaminochalcone
b-3-6 3,3'-dihydroxy-4,4'-diaminobiphenyl

TABLE 2

| Composition (mole %) | | | Comparative Synthesis Example | | | | |
|---|---|---|---|---|---|---|---|
| | | | A-2-1 | A-2-2 | A-2-3 | A-2-4 | A-2-5 |
| Tetracarboxylic Dianhydride Compound (a) | | a-1 | 100 | | | 100 | |
| | | a-2 | | 100 | | | 100 |
| | | a-3 | | | 100 | | |
| Diamine Compound (b) | Diamine (b-1) | b-1-1 | | | | | |
| | | b-1-2 | | | | 30 | |
| | | b-1-3 | | | | | |
| | | b-1-4 | | | | | |
| | | b-1-5 | | | | | |
| | | b-1-6 | | | | | |
| | | b-1-7 | | | | | |
| | | b-1-8 | | | | | |
| | Diamine (b-2) | b-2-1 | | | | | |
| | | b-2-2 | | | | | 50 |
| | | b-2-3 | | | 40 | | |
| | | b-2-4 | | | | | |
| | Diamine (b-3) | b-3-1 | 100 | | | | 50 |
| | | b-3-2 | | 50 | | | |
| | | b-3-3 | | | | | |
| | | b-3-4 | | | | 70 | |
| | | b-3-5 | | 50 | 60 | | |
| | | b-3-6 | | | | | |
| Molar Ratio [(b-1)/(b-2)] | | | — | — | 0 | — | 0 |

TABLE 2-continued

| Composition (mole %) | Comparative Synthesis Example | | | | |
|---|---|---|---|---|---|
| | A-2-1 | A-2-2 | A-2-3 | A-2-4 | A-2-5 |
| a-1-1 2,3,5-tricarboxycyclopentylacetic dianhydride | | | | | |
| a-1-2 1,2,3,4-cyclobutane tetracarboxylic dianhydride | | | | | |
| a-1-3 pyromellitic dianhydride | | | | | |
| b-1-1 3-(3,4,5-triaminophenyl)-2-propen-1-ol | | | | | |
| b-1-3 2,5-diamino-α-ethyl-benzenemethanol | | | | | |
| b-1-3 2,5-diamino-benzeneethanol | | | | | |
| b-1-4 2,4-diamino-5-methoxy-benzenemethanol | | | | | |
| b-1-5 4,5-diamino-2-bromo-benzenemethanol | | | | | |
| b-1-6 4,6-diamino-1,3-benzenediethanol | | | | | |
| b-1-7 2,5-diamino-3-methyl-benzeneethanol | | | | | |
| b-1-8 3,4-diamino-benzeneethanol | | | | | |
| b-2-1 diamine having a structure of formula (II-1-3) | | | | | |
| b-2-2 diamine having a structure of formula (II-1-6) | | | | | |
| b-2-3 diamine having a structure of formula (II-2-1) | | | | | |
| b-2-4 diamine having a structure of formula (II-1-7) | | | | | |
| b-3-1 p-diaminobenzene | | | | | |
| b-3-2 2,2'-dimethyl-4,4'-diamino biphenyl | | | | | |
| b-3-3 4,4'-methylenebis(cyclohexylamine) | | | | | |
| b-3-4 1,4-diaminocyclohexane | | | | | |
| b-3-5 3,3'-diaminochalcone | | | | | |
| b-3-6 3,3'-dihydroxy-4,4'-diaminobiphenyl | | | | | |

TABLE 3

| Composition (Parts by Weight) | | Example | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Polymer | A-1-1 | 100 | | | | | | | | | | | | | | 30 |
| Composition | A-1-2 | | 100 | | | | | | | | | | | | | |
| (A) | A-1-3 | | | 100 | | | | | | | | | | | | |
| | A-1-4 | | | | 100 | | | | | | | | | | | |
| | A-1-5 | | | | | 100 | | | | | | | | | 80 | |
| | A-1-6 | | | | | | 100 | | | | | | 60 | | | |
| | A-1-7 | | | | | | | 100 | | | | | | 70 | | |
| | A-1-8 | | | | | | | | 100 | | | | | | | 70 |
| | A-1-9 | | | | | | | | | 100 | | | | | | |
| | A-1-10 | | | | | | | | | | 100 | | | | 50 | 20 |
| | A-2-1 | | | | | | | | | | | | 40 | | | |
| | A-2-2 | | | | | | | | | | | | | | 50 | |
| | A-2-3 | | | | | | | | | | | | | 30 | | |
| | A-2-4 | | | | | | | | | | | | | | | |
| | A-2-5 | | | | | | | | | | | | | | | |
| Solvent | B-1 | 1200 | | 800 | | 1000 | 1000 | 850 | 1400 | | | 800 | 400 | | 1200 | |
| (B) | B-2 | 600 | 1600 | | 500 | 1500 | | | 850 | | 1000 | 750 | 400 | 1200 | 800 | |
| | B-3 | | | | 100 | 600 | | | | | 350 | 1500 | | 400 | 250 | |
| Additive | C-1 | | | | | | | | 5 | | | | 3 | | | |
| (C) | C-2 | | | 10 | | | | | | | | | 3 | | | |
| Evaluation Method | Reliability | ○ | ○ | ○ | ○ | ○ | ○ | ○ | ○ | ○ | ○ | ○ | ○ | ○ | ○ | ○ |
| | Response Velocity | ◎ | ◎ | ◎ | ◎ | ◎ | ◎ | ◎ | ◎ | ○ | ○ | ◎ | ◎ | ○ | ◎ | ◎ |

B-1 N-methyl-2-pyrrolidinone

B-2 ethylene glycol n-butyl ether

B-3 N,N-dimethylacetamide

C-1 N,N,N',N'-tetraglycidyl-4,4'-diaminodiphenylmethane

C-2 N,N-glycidyl-p-glycidoxy aniline

TABLE 4

| Composition (Parts by Weight) | | Comparative Example | | | | |
|---|---|---|---|---|---|---|
| | | 1 | 2 | 3 | 4 | 5 |
| Polymer Composition (A) | A-1-1 | | | | | |
| | A-1-2 | | | | | |
| | A-1-3 | | | | | |
| | A-1-4 | | | | | |
| | A-1-5 | | | | | |
| | A-1-6 | | | | | |
| | A-1-7 | | | | | |
| | A-1-8 | | | | | |
| | A-1-9 | | | | | |
| | A-1-10 | | | | | |
| | A-2-1 | 100 | | | | |
| | A-2-2 | | 100 | | | |
| | A-2-3 | | | 100 | | |
| | A-2-4 | | | | 100 | |
| | A-2-5 | | | | | 100 |
| Solvent (B) | B-1 | 1200 | | 800 | 1000 | |
| | B-2 | 600 | 1600 | | 600 | 1500 |
| | B-3 | | | 1000 | | 100 |
| Additive (C) | C-1 | | | | | |
| | C-2 | | | | | |
| Evaluation Method | Reliability | X | X | X | X | X |
| | Response Velocity | X | X | X | X | X |

B-1 N-methyl-2-pyrrolidinone
B-2 ethylene glycol n-butyl ether
B-3 N,N-dimethylacetamide
C-1 N,N,N',N'-tetraglycidyl-4,4'-diaminodiphenylmethane
C-2 N,N-glycidyl-p-glycidoxy aniline

What is claimed is:

1. A liquid crystal alignment agent, comprising:
a polymer composition (A), obtained by a mixture, and the mixture includes a tetracarboxylic dianhydride compound (a) and a diamine compound (b); and
a solvent (B),
wherein the diamine compound (b) includes at least one diamine (b-1) having a structure of formula (I) and at least one diamine (b-2) having a structure of formula (II):

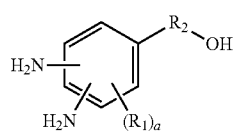

(I)

in the formula (I), $R_1$ respectively represents a linear or branched alkyl group of 1 to 6 carbons, a linear or branched hydroxyl alkyl group of 1 to 6 carbons, an alkoxy group of 1 to 6 carbons, an alkylthio group of 1 to 6 carbons, a halogen atom, an amino group or a nitro group; $R_2$ represents a methylene group, a divalent alkyl group of 2 to 10 carbons, a divalent alkenyl group of 2 to 7 carbons or a divalent alkynyl group of 2 to 6 carbons; and a represents an integer of 0 to 3;

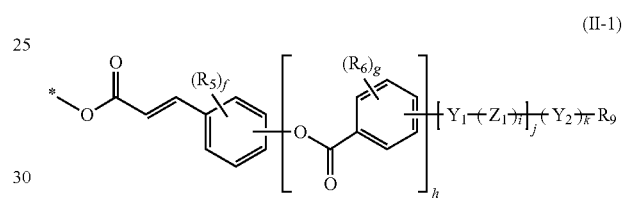

(II)

in the formula (II), $R_3$ and $R_4$ respectively represent an alkyl group of 1 to 6 carbons, an alkoxy group of 1 to 6 carbons, a halogen atom, or a cyano group; b and d respectively represent an integer of 0 to 4; e represents 0 or 1; and * respectively represent a bonding position.

2. The liquid crystal alignment agent of claim 1, wherein the at least one diamine (b-2) having a structure of formula (II) includes a compound having a structure if formula (II-1), a compound having a structure of formula (II-2) or a combination thereof:

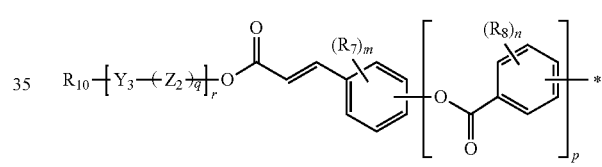

in the formula (II-1) and the formula (II-2), $R_5$, $R_6$, $R_7$ and $R_8$ respectively represent an alkyl group of 1 to 6 carbons, an alkoxy group of 1 to 6 carbons, a halogen atom or a cyano group; $R_9$ and $R_{10}$ respectively represent an alkyl group of 1 to 40 carbons or a chloride-substituted alkyl group of 1 to 40 carbons; $Y_1$, $Y_2$ and $Y_3$ respectively represent

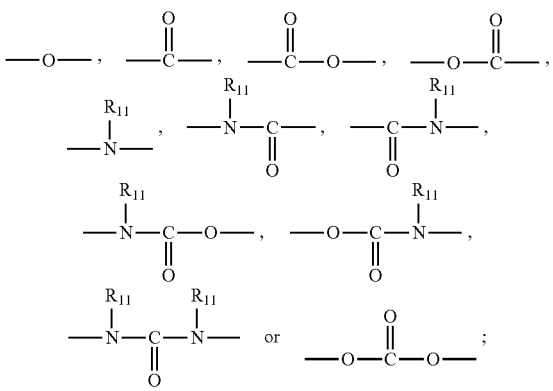

R11 represents a hydrogen atom or an alkyl group of 1 to 4 carbons; Z1 and Z2 respectively represent a methylene group, —Si(CH3)2-, —CH=CH—, —C≡C—, a methylene group having a substituent, —Si(CH3)2— having a substituent, or —CH=CH— having a substituent, and the substituent is a cyano group, a halogen atom, or an alkyl group of 1 to 4 carbons; f, g, m and n respectively represent an integer of 0 to 4; h and p respectively represent 0 or 1; i and q respectively represent an integer of 1 to 6; j and r respectively represent an integer of 0 to 2; k represents 0 or 1; when i, j, k, q or r is greater than 1, a plurality of Y1, Y2, Y3, Z1 or Z2 optionally are the same or different; and * respectively represents a bonding position.

3. The liquid crystal alignment agent of claim 1, wherein based on a total amount of the diamine compound (b) as 100 moles, an amount of the at least one diamine (b-1) having a structure of formula (I) is 5 moles to 40 moles, and an amount of the at least one diamine (b-2) having a structure of formula (II) is 30 moles to 70 moles.

4. The liquid crystal alignment agent of claim 1, wherein a molar ratio [(b-1)/(b-2)] of the at least one diamine (b-1) having a structure of formula (I) to the at least one diamine (b-2) having a structure of formula (II) is 0.1 to 1.2.

5. The liquid crystal alignment agent of claim 4, wherein the molar ratio [(b-1)/(b-2)] of the at least one diamine (b-1) having a structure of formula (I) to the at least one diamine (b-2) having a structure of formula (II) is 0.2 to 1.2.

6. The liquid crystal alignment agent of claim 5, wherein the molar ratio [(b-1)/(b-2)] of the at least one diamine (b-1) having a structure of formula (I) to the at least one diamine (b-2) having a structure of formula (II) is 0.2 to 1.1.

7. A liquid crystal alignment film, comprising a liquid crystal alignment agent of claim 1.

8. A liquid crystal display element, comprising a liquid crystal alignment film of claim 7.

* * * * *